(12) United States Patent
Tsukagoshi

(10) Patent No.: US 11,089,285 B2
(45) Date of Patent: Aug. 10, 2021

(54) TRANSMISSION DEVICE, TRANSMISSION METHOD, RECEPTION DEVICE, AND RECEPTION METHOD

(71) Applicant: SONY CORPORATION, Tokyo (JP)

(72) Inventor: Ikuo Tsukagoshi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/635,583

(22) PCT Filed: Aug. 6, 2018

(86) PCT No.: PCT/JP2018/029492
§ 371 (c)(1),
(2) Date: Jan. 31, 2020

(87) PCT Pub. No.: WO2019/031469
PCT Pub. Date: Feb. 14, 2019

(65) Prior Publication Data
US 2020/0186780 A1   Jun. 11, 2020

(30) Foreign Application Priority Data
Aug. 10, 2017   (JP) ............................. JP2017-155800

(51) Int. Cl.
*H04N 13/161*   (2018.01)
*H04N 13/178*   (2018.01)
(Continued)

(52) U.S. Cl.
CPC ......... *H04N 13/194* (2018.05); *H04N 13/161* (2018.05); *H04N 13/178* (2018.05); *H04N 13/363* (2018.05)

(58) Field of Classification Search
CPC ................ H04N 21/44; H04N 21/845; H04N 21/85406; H04N 21/2343; H04N 21/816
See application file for complete search history.

(56) References Cited

U.S. PATENT DOCUMENTS

2016/0373789 A1* 12/2016 Tsukagoshi .......... H04N 21/235
2019/0373245 A1* 12/2019 Lee ................ H04N 21/234345

FOREIGN PATENT DOCUMENTS

JP          2016-194784 A     11/2016

OTHER PUBLICATIONS

Extended European Search Report dated May 13, 2020 in European Patent Application No. 18845104.1, 9 pages.
(Continued)

*Primary Examiner* — Tsion B Owens
(74) *Attorney, Agent, or Firm* — Oblon, McClelland, Maier & Neustadt, L.L.P.

(57) ABSTRACT

It is made possible to obtain a common image between a VR-compatible terminal and a VR non-compatible terminal when distributing VR content. A projection picture having a rectangular shape is obtained by cutting off a part or the whole of a spherical capture image and performing in-plane packing on the cut-off spherical capture image. A video stream is obtained by encoding image data of this projection picture. A container containing this video stream is transmitted. Meta information for rendering the projection picture is inserted into at least one of a layer of the container or a layer of the video stream. The center of a cut-out position indicated by cut-out position information inserted in a layer of the video stream is adjusted to coincide with a reference point of the projection picture indicated by the meta information for rendering.

18 Claims, 36 Drawing Sheets

(51) Int. Cl.
*H04N 13/194* (2018.01)
*H04N 13/363* (2018.01)

(56) References Cited

OTHER PUBLICATIONS

Thomas Stockhammer, "[OMAF] Viewport-Independent Baseline Video Profile," Qualcomm Incorporated, ISO/IEC JTC1/SC29/WG11 MPEG2016/M41192, XP030069535, Jul. 2017, 14 pages.

Sejin Oh, et al., "Static Metadata for VR Video in ISO Base Media File Format," LG Electronics, ISO/IEC JTC1/SC29/WG11 MPEG2016/m39230, XP030067576, Oct. 2016, 12 pages.

International Search Report dated Sep. 18, 2018 in PCT/JP2018/029492 filed Aug. 6, 2018, 3 pages.

Fogg, C., et al., "Suggested draft text for omni-directional projection indication SEI message with equirectangular projection", Motion Picture Laboratories, Intel, Microsoft, Apple; Joint Collaborative Team on Video Coding (JCT-VC) of ITU-T SG 16 WP 3 and ISO/IEC JTC 1/SC 29/WG 11; 26th Meeting: Geneva, CH, Jan. 12-20, 2017; Document: JCTVC-Z0051t_v2 (10 pages).

Oh, S., et al., "SEI message for signaling of 360-degree video information", LG Electronics; Joint Collaborative Team on Video Coding (JCT-VC) of ITU-T SG 16 WP 3 and ISO/IEC JTC 1/SC 29/WG 11; 26th Meeting: Geneva, CH, Jan. 12-20, 2017; Document: JCTVC-Z0026 (10 pages).

Boyce, J., et al. "Spherical viewpoint SEI for HEVC and AVC 360 video", Intel; Joint Collaborative Team on Video Coding (JCT-VC) of ITU-T SG 16 WP 3 and ISO/IEC JTC 1/SC 29/WG 11; 26th Meeting: Geneva, CH, Jan. 12-20, 2017; Document: JCTVC-Z0034 (9 pages).

3rd Generation Partnership Project; Technical Specification Group Services and System Aspects; Virtual Reality (VR) media services over 3GPP (Release 15); 3GPP TR 26.918 V1.2.0 (Jun. 2017), 32 pages.

Fogg, C., et al., "Suggested draft text for omni-directional projection indication SEI message with equirectangular projection", Motion Picture Laboratories, Intel, Microsoft; Joint Collaborative Team on Video Coding (JCT-VC) of ITU-T SG 16 WP 3 and ISO/IEC JTC 1/SC 29/WG 11; 26th Meeting: Geneva, CH, Jan. 12-20, 2017; Document: JCTVC-Z0036 (9 pages).

Hannuksela, M., et al., "SEI messages for omnidirectional video", Nokia; Joint Collaborative Team on Video Coding (JCT-VC) of ITU-T SG 16 WP 3 and ISO/IEC JTC 1/SC 29/WG 11; 26th Meeting: Geneva, CH, Jan. 12-20, 2017; Document: JCTVC-Z0044 (9 pages).

\* cited by examiner

FIG. 6

HEVC SPS

| Syntax | No. of Bits | Format |
|---|---|---|
| Seq_parameter_set_rbsp() { | | |
|    SPS_video_parameter_set_id | | uimsbf |
|    SPS_max_sub_layers_minus1 | | |
| | | |
|    : | | |
| | | |
|    pic_width_in_luma_samples | | ue(v) |
|    pic_height_in_luma_samples | | ue(v) |
|    conformance_window_flag | | u(1) |
|    if( conformance_window_flag ) { | | |
|       conf_win_left_offset | | ue(v) |
|       conf_win_right_offset | | ue(v) |
|       conf_win_top_offset | | ue(v) |
|       conf_win_bottom_offset | | ue(v) |
|    } | | |
| | | |

FIG. 9

Rendering_metadata (CASE WHERE RP IS TRANSFERRED)

| Syntax | No. of Bits | Format |
|---|---|---|
| Rendering_metadata( ) { | | |
|   rendering_metadata_id | 16 | uimsbf |
|   rendering_metadata_length | 16 | uimsbf |
|   start_offset_sphere_latitude | 16 | uimsbf |
|   start_offset_sphere_longitude | 16 | tcimsbf |
|   end_offset_sphere_latitude | 16 | uimsbf |
|   end_offset_sphere_longitude | 16 | tcimsbf |
|   projection_pic_size_horizontal | 16 | uimsbf |
|   projection_pic_size_vertical | 16 | uimsbf |
|   scaling_ratio_horizontal | 16 | uimsbf |
|   scaling_ratio_vertical | 16 | uimsbf |
|   reference_point_horizontal | 16 | uimsbf |
|   reference_point_vertical | 16 | uimsbf |
|   format_type | 5 | uimsbf |
|   backwardcompatible | 1 | bslbf |
|   reserved | 2 | bslbf |
|   number_of_regions | 8 | uimsbf |
|   for( i = 0; i < number_of_regions; i++ ){ | | |
|     region_id[i] | 8 | uimsbf |
|     start_offset_horizontal_region[i] | 16 | uimsbf |
|     start_offset_vertical_region[i] | 16 | uimsbf |
|     width_region[i] | 16 | uimsbf |
|     height_region[i] | 16 | uimsbf |
|     default_region_flag[i] | 1 | bslbf |
|     reserved | 7 | bslbf |
|   } | | |
| } | | |

FIG. 11

Rendering_metadata (CASE WHERE RP IS NOT TRANSFERRED)

| Syntax | No. of Bits | Format |
|---|---|---|
| Rendering_metadata( ) { | | |
|    rendering_metadata_id | 16 | uimsbf |
|    rendering_metadata_length | 16 | uimsbf |
|    start_offset_sphere_latitude | 16 | uimsbf |
|    start_offset_sphere_longitude | 16 | tcimsbf |
|    end_offset_sphere_latitude | 16 | uimsbf |
|    end_offset_sphere_longitude | 16 | tcimsbf |
|    projection_pic_size_horizontal | 16 | uimsbf |
|    projection_pic_size_vertical | 16 | uimsbf |
|    scaling_ratio_horizontal | 16 | uimsbf |
|    scaling_ratio_vertical | 16 | uimsbf |
|    format_type | 5 | uimsbf |
|    backwardcompatible | 1 | bslbf |
|    reserved | 2 | bslbf |
|    number_of_regions | 8 | uimsbf |
|    for( i = 0; i< number_of_regions; i++ ){ | | |
|       region_id[i] | 8 | uimsbf |
|       start_offset_horizontal_region[i] | 16 | uimsbf |
|       start_offset_vertical_region[i] | 16 | uimsbf |
|       width_region[i] | 16 | uimsbf |
|       height_region[i] | 16 | uimsbf |
|       default_region_flag[i] | 1 | bslbf |
|       reserved | 7 | bslbf |
|    } | | |
| } | | |

FIG. 13

Semantics

| | |
|---|---|
| rendering_metadata_id (16bits) | ID THAT IDENTIFIES rendering_metadata STRUCTURE |
| rendering_metadata_length (16bits) | BYTE SIZE OF rendering_metadata STRUCTURE |
| start_offset_sphere_latitude (16bits) | LATITUDE (VERTICAL DIRECTION) OF START OFFSET FOR CUTTING OFF FROM SPHERE SURFACE |
| start_offset_sphere_longitude (16bits) | LONGITUDE (HORIZONTAL DIRECTION) OF START OFFSET FOR CUTTING OFF FROM SPHERE SURFACE |
| end_offset_sphere_latitude (16bits) | LATITUDE (VERTICAL DIRECTION) OF END OFFSET FOR CUTTING OFF FROM SPHERE SURFACE |
| end_offset_sphere_longitude (16bits) | LONGITUDE (HORIZONTAL DIRECTION) OF END OFFSET FOR CUTTING OFF FROM SPHERE SURFACE |
| projection_pic_size_horizontal (16bits) | HORIZONTAL PIXEL COUNT FROM top-left IN SIZE OF projection picture |
| projection_pic_size_vertical (16bits) | VERTICAL PIXEL COUNT FROM top-left IN SIZE OF projection picture |
| scaling_ratio_horizontal (16bits) | HORIZONTAL SCALING RATIO FROM ORIGINAL SIZE OF projection picture |
| scaling_ratio_vertical (16bits) | VERTICAL SCALING RATIO FROM ORIGINAL SIZE OF projection picture |
| Reference_point_horizontal (16bits) | HORIZONTAL PIXEL POSITION OF REFERENCE POINT OF projection picture |
| Reference_point_vertical (16bits) | VERTICAL PIXEL POSITION OF REFERENCE POINT OF projection picture |
| format_type (5bits) | FORMAT TYPE OF projection picture<br>0: equirectangular<br>1: cross-cubic<br>2: partitioned cross cubic<br>others reserved |
| Backwardcompatible (1bit) | INDICATES WHETHER OR NOT BACKWARD COMPATIBILITY IS SET<br>0: BACKWARD COMPATIBILITY IS NOT SET<br>1: BACKWARD COMPATIBILITY IS SET |
| number_of_regions (8bits) | INDICATES NUMBER OF regions IN projection picture |
| Region_id (8bits) | INDICATES IDENTIFICATION NUMBER OF region |
| start_offset_horizontal_region[i] (16bits) | INDICATES HORIZONTAL START PIXEL OFFSET OF i-TH region |
| start_offset_vertical_region[i] (16bits) | INDICATES VERTICAL START PIXEL OFFSET OF i-TH region |
| width_region[i] (16bits) | INDICATES HORIZONTAL WIDTH OF i-TH region BY NUMBER OF PIXELS |
| height_region[i] (16bits) | INDICATES VERTICAL WIDTH OF i-TH region BY NUMBER OF PIXELS |
| default_region_flag (1bit) | INDICATES WHETHER OR NOT i-TH region IS default region<br>0: i-TH region IS NOT default region<br>1: i-TH region IS default region |

FIG. 16 semantics

```
<SupplementaryDescriptor schemeIdUri="urn:brdcst:video:renderingmetadata" value="type"/>
INDICATES PRESENCE OF VR RENDERING METADATA
    value=1    RENDERING METADATA IS PRESENT
    value=0    RENDERING METADATA IS NOT PRESENT
<SupplementaryDescriptor schemeIdUri="urn:brdcst:video:projectiontype" value="type"/>
INDICATES FORMAT TYPE OF VR PROJECTION PICTURE
    value=2    partitioned cross cubic
    value=1    cross-cubic
    value=0    equirectangular
<SupplementaryDescriptor schemeIdUri="urn:brdcst:video:backwardcompatible" value="type"/>
INDICATES BACKWARD COMPATIBILITY WITH CONVENTIONAL (VR NON-COMPATIBLE) DISPLAY
    value=1    BACKWARD COMPATIBILITY WITH CONVENTIONAL DISPLAY IS ENABLED
    value=0    BACKWARD COMPATIBILITY WITH CONVENTIONAL DISPLAY IS DISABLED
```

[Case1] CASE WHERE Front view IS default view

SPECIFICATION OF RP POSITION
x = projection_pic_size_horizontal * 1/8
y = projection_pic_size_vertical * 1/2

SPECIFICATION OF Conformance_window
conf_win_left_offset   = 0
conf_win_right_offset  = projection_pic_size_horizontal * 1/4
conf_win_top_offset    = projection_pic_size_vertical * 1/3
conf_win_bottom_offset = projection_pic_size_vertical * 2/3

(b)

[Case2] CASE WHERE Left view IS default view

SPECIFICATION OF RP POSITION
x = projection_pic_size_horizontal * 7/8
y = projection_pic_size_vertical * 1/2

SPECIFICATION OF Conformance_window
conf_win_left_offset   = projection_pic_size_horizontal * 3/4
conf_win_right_offset  = projection_pic_size_horizontal
conf_win_top_offset    = projection_pic_size_vertical * 1/3
conf_win_bottom_offset = projection_pic_size_vertical * 2/3

FIG. 27

Rendering_metadata (CASE WHERE RP IS TRANSFERRED)

| Syntax | No. of Bits | Format |
|---|---|---|
| Rendering_metadata( ) { | | |
| rendering_metadata_id | 16 | uimsbf |
| rendering_metadata_length | 16 | uimsbf |
| start_offset_sphere_latitude | 16 | uimsbf |
| start_offset_sphere_longitude | 16 | tcimsbf |
| end_offset_sphere_latitude | 16 | uimsbf |
| end_offset_sphere_longitude | 16 | tcimsbf |
| projection_pic_size_horizontal | 16 | uimsbf |
| projection_pic_size_vertical | 16 | uimsbf |
| scaling_ratio_horizontal | 16 | uimsbf |
| scaling_ratio_vertical | 16 | uimsbf |
| Reference_point_horizontal | 16 | uimsbf |
| Reference_point_vertical | 16 | uimsbf |
| format_type | 5 | uimsbf |
| backwardcompatible | 1 | bslbf |
| reserved | 2 | bslbf |
| partition_id | 8 | uimsbf |
| partition_start_offset_horizontal | 16 | uimsbf |
| partition_start_offset_vertical | 16 | tcimsbf |
| partition_end_offset_horizontal | 16 | uimsbf |
| partition_end_offset_vertical | 16 | tcimsbf |

| Syntax | No. of Bits | Format |
|---|---|---|
| number_of_regions | 8 | uimsbf |
| for( i = 0; i < number_of_regions; i++ ){ | | |
| region_id[i] | 8 | uimsbf |
| start_offset_horizontal_region[i] | 16 | uimsbf |
| start_offset_vertical_region[i] | 16 | uimsbf |
| width_region[i] | 16 | uimsbf |
| height_region[i] | 16 | uimsbf |
| default_region_flag[i] | 1 | bslbf |
| reserved | 7 | bslbf |
| } | | |
| } | | |

FIG. 28

Rendering_metacata (CASE WHERE RP IS NOT TRANSFERRED)

| Syntax | No. of Bits | Format |
|---|---|---|
| Rendering_metacata() { | | |
| rendering_metadata_id | 16 | uimsbf |
| rendering_metadata_length | 16 | uimsbf |
| start_offset_sphere_latitude | 16 | tcimsbf |
| start_offset_sphere_longitude | 16 | uimsbf |
| end_offset_sphere_latitude | 16 | tcimsbf |
| end_offset_sphere_longitude | 16 | uimsbf |
| projection_pic_size_horizontal | 16 | uimsbf |
| projection_pic_size_vertical | 16 | uimsbf |
| scaling_ratio_horizontal | 16 | uimsbf |
| scaling_ratio_vertical | 16 | uimsbf |
| format_type | 5 | uimsbf |
| backwardcompatible | 1 | bslbf |
| reserved | 2 | bslbf |
| partition_id | 8 | uimsbf |
| partition_start_offset_horizontal | 16 | uimsbf |
| partition_start_offset_vertical | 16 | tcimsbf |
| partition_end_offset_horizontal | 16 | uimsbf |
| partition_end_offset_vertical | 16 | tcimsbf |

| Syntax | No. of Bits | Format |
|---|---|---|
| number_of_regions | 8 | uimsbf |
| for( i = 0; i < number_of_regions; i++ ){ | | |
| region_id[i] | 8 | uimsbf |
| start_offset_horizontal_region[i] | 16 | uimsbf |
| start_offset_vertical_region[i] | 16 | uimsbf |
| width_region[i] | 16 | uimsbf |
| height_region[i] | 16 | uimsbf |
| default_region_flag[i] | 1 | bslbf |
| reserved | 7 | bslbf |
| } | | |
| } | | |

FIG. 29

Semantics

| Field | Description |
|---|---|
| rendering_metadata_id (16bits) | ID THAT IDENTIFIES rendering_metadata STRUCTURE |
| rendering_metadata_length (16bits) | BYTE SIZE OF rendering_metadata STRUCTURE |
| start_offset_sphere_latitude (16bits) | LATITUDE (VERTICAL DIRECTION) OF START OFFSET FOR CUTTING OFF FROM SPHERE SURFACE |
| start_offset_sphere_longitude (16bits) | LONGITUDE (HORIZONTAL DIRECTION) OF START OFFSET FOR CUTTING OFF FROM SPHERE SURFACE |
| end_offset_sphere_latitude (16bits) | LATITUDE (VERTICAL DIRECTION) OF END OFFSET FOR CUTTING OFF FROM SPHERE SURFACE |
| end_offset_sphere_longitude (16bits) | LONGITUDE (HORIZONTAL DIRECTION) OF END OFFSET FOR CUTTING OFF FROM SPHERE SURFACE |
| projection_pic_size_horizontal (16bits) | HORIZONTAL PIXEL COUNT FROM top-left IN SIZE OF projection picture |
| projection_pic_size_vertical (16bits) | VERTICAL PIXEL COUNT FROM top-left IN SIZE OF projection picture |
| scaling_ratio_horizontal (16bits) | HORIZONTAL SCALING RATIO FROM ORIGINAL SIZE OF projection picture |
| scaling_ratio_vertical (16bits) | VERTICAL SCALING RATIO FROM ORIGINAL SIZE OF projection picture |
| Reference_point_horizontal (16bits) | HORIZONTAL PIXEL POSITION OF REFERENCE POINT OF projection picture |
| Reference_point_vertical (16bits) | VERTICAL PIXEL POSITION OF REFERENCE POINT OF projection picture |
| format_type (5bits) | FORMAT TYPE OF projection picture<br>0: Equirectangular<br>1: cross cubic<br>2: partitioned cross cubic<br>others reserved |
| Backwardcompatible (1bit) | INDICATES WHETHER OR NOT BACKWARD COMPATIBILITY IS SET<br>0: BACKWARD COMPATIBILITY IS NOT SET<br>1: BACKWARD COMPATIBILITY IS SET |
| number_of_regions (8bits) | INDICATES NUMBER OF regions IN projection picture |
| Region_id (8bits) | INDICATES IDENTIFICATION NUMBER OF region |
| start_offset_horizontal_region[i] (16bits) | INDICATES HORIZONTAL START PIXEL OFFSET OF i-TH region |
| start_offset_vertical_region[i] (16bits) | INDICATES VERTICAL START PIXEL OFFSET OF i-TH region |
| width_region[i] (16bits) | INDICATES HORIZONTAL WIDTH OF i-TH region BY NUMBER OF PIXELS |
| height_region[i] (16bits) | INDICATES VERTICAL WIDTH OF i-TH region BY NUMBER OF PIXELS |
| default_region_flag (1bit) | INDICATES WHETHER OR NOT i-TH region IS default region<br>0: i-TH region IS NOT default region<br>1: i-TH region IS default region |
| Partition_id (8bits) | INDICATES partition IDENTIFICATION INFORMATION |
| partition_start_offset_horizontal (16bits) | INDICATES HORIZONTAL partition START POSITION BY NUMBER OF PIXELS FROM BASE POINT (0, 0) OF projection picture |
| partition_start_offset_vertical (16bits) | INDICATES VERTICAL partition START POSITION BY NUMBER OF PIXELS FROM BASE POINT (0, 0) OF projection picture |
| partition_end_offset_horizontal (16bits) | INDICATES HORIZONTAL partition END POSITION BY NUMBER OF PIXELS FROM BASE POINT (0, 0) OF projection picture |
| partition_end_offset_vertical (16bits) | INDICATES VERTICAL partition END POSITION BY NUMBER OF PIXELS FROM BASE POINT (0, 0) OF projection picture |

FIG. 30

```
MPD

<Period>
  <AdaptationSet mimeType="video/mp4" codecs="hev1.xx.xx.Lxxx.xx">
    <SupplementaryDescriptor schemeIdUri="urn:brdcst:video:formattype" value="2"/>
    <SupplementaryDescriptor schemeIdUri="urn:brdcst:video:partitionid" value="0"/>
    <SupplementaryDescriptor schemeIdUri="urn:brdcst:video:partitionstartpositionhorizontal" value/>
    <SupplementaryDescriptor schemeIdUri="urn:brdcst:video:partitionstartpositionvertical" value/>
    <SupplementaryDescriptor schemeIdUri="urn:brdcst:video:partitionendpositionhorizontal" value/>
    <SupplementaryDescriptor schemeIdUri="urn:brdcst:video:partitionendpositionvertical" value/>
    <SupplementaryDescriptor schemeIdUri="urn:brdcst:video:renderingmetadata" value="1"/>
    <SupplementaryDescriptor schemeIdUri="urn:brdcst:video:backwardcompatible" value="1"/>
    <Representation>
      <width="" height="" frameRate=""
      codecs="hev1.xx.xx.Lxxx.xx"
      level="0"/>
      <BaseURL>videostreamVR.mp4</BaseURL>
    </Representation>
  </AdaptationSet>
  <AdaptationSet mimeType="video/mp4" codecs="hev1.xx.xx.Lxxx.xx">
    <SupplementaryDescriptor schemeIdUri="urn:brdcst:video:formattype" value="2"/>
    <SupplementaryDescriptor schemeIdUri="urn:brdcst:video:partitionid" value="1"/>
    <SupplementaryDescriptor schemeIdUri="urn:brdcst:video:partitionstartpositionhorizontal" value/>
    <SupplementaryDescriptor schemeIdUri="urn:brdcst:video:partitionstartpositionvertical" value/>
    <SupplementaryDescriptor schemeIdUri="urn:brdcst:video:partitionendpositionhorizontal" value/>
    <SupplementaryDescriptor schemeIdUri="urn:brdcst:video:partitionendpositionvertical" value/>
    <SupplementaryDescriptor schemeIdUri="urn:brdcst:video:renderingmetadata" value="1"/>
    <SupplementaryDescriptor schemeIdUri="urn:brdcst:video:backwardcompatible" value="1"/>
    <Representation>
      <width="" height="" frameRate=""
      codecs="hev1.xx.xx.Lxxx.xx"
      level="0"/>
      <BaseURL>videostreamVR.mp4</BaseURL>
    </Representation>
  </AdaptationSet>
  :
</Period>
```

FIG. 35

HDMI Info Frame structure for Rendering_metadata

| Byte / Bit # | 7 | 6 | 5 | 4 | 3 | 2 | 1 | 0 |
|---|---|---|---|---|---|---|---|---|
| Info Frame Type Code | | | | New InfoFrame Type | | | | |
| Info Frame Version Number | | | | Version = 0x01 | | | | |
| Length of HFR Blending InfoFrame | | | | Length | | | | |
| Data Byte 1 | | | Projection format type | | | reserved | | BW compatible |
| Data Byte 2 | | | | Number of regions | | | | |
| Data Byte 3 | | | | Start offset sphere latitude (upper) | | | | |
| Data Byte 4 | | | | Start offset sphere latitude (lower) | | | | |
| Data Byte 5 | | | | Start offset sphere longitude (upper) | | | | |
| Data Byte 6 | | | | Start offset sphere longitude (lower) | | | | |
| Data Byte 7 | | | | End offset sphere latitude (upper) | | | | |
| Data Byte 8 | | | | End offset sphere latitude (lower) | | | | |
| Data Byte 9 | | | | End offset sphere longitude (upper) | | | | |
| Data Byte 10 | | | | End offset sphere longitude (lower) | | | | |
| Data Byte 11 | | | | Projection pic size horizontal (upper) | | | | |
| Data Byte 12 | | | | Projection pic size horizontal (lower) | | | | |
| Data Byte 13 | | | | Projection pic size vertical (upper) | | | | |
| Data Byte 14 | | | | Projection pic size vertical (lower) | | | | |

(CONTINUED TO NEXT PAGE)

FIG. 36

(CONTINUED FROM PREVIOUS PAGE)

| | | |
|---|---|---|
| Data Byte 15 | Scaling ratio horizontal (upper) | |
| Data Byte 16 | Scaling ratio horizontal (lower) | |
| Data Byte 17 | Scaling ratio vertical (upper) | |
| Data Byte 18 | Scaling ratio vertical (lower) | |
| Data Byte 19 | Reference point horizontal (upper) | |
| Data Byte 20 | Reference point horizontal (lower) | |
| Data Byte 21 | Reference point vertical (upper) | |
| Data Byte 22 | Reference point vertical (lower) | |
| Data Byte 23 | Region_id[0] | |
| Data Byte 24 | Start offset horizontal region[0] (upper) | |
| Data Byte 25 | Start offset horizontal region[0] (lower) | |
| Data Byte 26 | Start offset vertical region[0] (upper) | |
| Data Byte 27 | Start offset vertical region[0] (lower) | |
| Data Byte 28 | Width region [0] (upper) | |
| Data Byte 29 | Width region [0] (lower) | |
| Data Byte 30 | Height region [0] (upper) | |
| Data Byte 31 | Height region [0] (lower) | |
| Data Byte 32 | Default region flag[0] | reserved |
| Data Byte 33 OR MORE | THEREAFTER, SPACE FROM Data byte 23 TO data byte 32 IS REPEATEDLY INSERTED, DEPENDING ON VALUE OF number of regions | |

TRANSMISSION DEVICE, TRANSMISSION METHOD, RECEPTION DEVICE, AND RECEPTION METHOD

TECHNICAL FIELD

The present technology relates to a transmission device, a transmission method, a reception device, and a reception method. In more detail, the present technology relates to a transmission device and the like that transmit a projection picture obtained by in-plane packing of a cut-out image from a spherical capture image.

BACKGROUND ART

Recently, distribution of virtual reality (VR) content has been considered. For example, Patent Document 1 describes that a front image and a back image with an ultra-wide viewing angle having a viewing angle of 180° or more are obtained by performing imaging using a back-to-back technique, and an equidistant cylindrical image is created from these two images and transmitted to a communication terminal. Here, the front image and the back image with an ultra-wide viewing angle having a viewing angle of 180° or more constitute a spherical capture image (360° VR image), and the equidistant cylindrical method is one of in-plane packing methods.

CITATION LIST

Patent Document
Patent Document 1: Japanese Patent Application Laid-Open No. 2016-194784

SUMMARY OF THE INVENTION

Problems to be Solved by the Invention

VR content distribution is effective with VR-compatible terminals. However, if consideration is not given to a case where a conventional VR non-compatible terminal receives VR content, a distorted image is displayed on the VR non-compatible terminal. It is necessary to ensure backward compatibility with the conventional terminal with respect to display.

An object of the present technology is to make it possible to obtain a common image between a VR-compatible terminal and a VR non-compatible terminal when distributing VR content.

Solutions to Problems

A concept of the present technology is in
a transmission device including:
a processing unit that cuts off a part or whole of a spherical capture image and performs in-plane packing on the cut-off spherical capture image to obtain a projection picture having a rectangular shape;
an encoding unit that encodes image data of the projection picture to obtain a video stream;
a transmission unit that transmits a container including the video stream; and
an insertion unit that inserts meta information for rendering the projection picture into a layer of the container and/or the video stream, in which
a center of a cut-out position indicated by cut-out position information inserted in a layer of the video stream coincides with a reference point of the projection picture indicated by the meta information for rendering.

In the present technology, a part or whole of the spherical capture image (360° VR image) is cut off, and in-plane packing is further performed on the cut-off spherical capture image by the processing unit such that a projection picture having a rectangular shape is obtained. For example, the spherical capture image is constituted by a front image and a back image with an ultra-wide viewing angle having a viewing angle of 180° or more. Furthermore, examples of the format type of in-plane packing include equirectangular, cross-cubic, and the like.

The image data of the projection picture is encoded by the encoding unit such that a video stream is obtained. A container including this video stream is transmitted by the transmission unit. For example, the container is an International Organization for Standardization base media file format (ISOBMFF) stream, a moving picture experts group 2-transport stream (MPEG2-TS), a moving picture experts group media transport (MMT) stream, or the like. Meta information for rendering the projection picture is inserted into a layer of the container and/or the video stream by the insertion unit. By inserting the meta information for rendering into the layer of the video stream, the meta information for rendering can be dynamically changed regardless of the container type.

The center of the cut-out position indicated by cut-out position information inserted in a layer of the video stream is adjusted to coincide with the reference point of the projection picture indicated by the meta information for rendering. For example, the projection picture may be made up of a plurality of regions including a default region whose position is centered on the reference point, and a position indicated by the cut-out position information may be adjusted to coincide with the position of the default region.

For example, the meta information for rendering may have position information on the reference point. Furthermore, for example, the meta information for rendering may have backward compatibility information indicating that the center of the cut-out position indicated by the cut-out position information inserted in the layer of the video stream coincides with the reference point of the projection picture indicated by the meta information for rendering. In addition, for example, the transmission unit may further transmit a metafile having meta information regarding the video stream, and identification information indicating the fact that the meta information for rendering is inserted in a layer of the container and/or the video stream may be further inserted into the metafile.

For example, the container may be in ISOBMFF, and the insertion unit may insert the meta information for rendering into a moov box. Furthermore, for example, the container may be an MPEG2-TS, and the insertion unit may insert the meta information for rendering into a program map table. In addition, for example, the container may be an MMT stream, and the insertion unit may insert the meta information for rendering into an MMT package table.

As described above, in the present technology, the center of the cut-out position indicated by the cut-out position information inserted in a layer of the video stream coincides with the reference point of the projection picture indicated by the meta information for rendering. Therefore, it is possible to obtain a common image between a VR-compatible terminal and a VR non-compatible terminal when distributing VR content.

Furthermore, another concept of the present technology is in a reception device including a reception unit that receives a container including a video stream obtained by encoding image data of a projection picture having a rectangular shape, in which the projection picture is obtained by cutting off a part or whole of a spherical capture image and performing in-plane packing on the cut-off spherical capture image, meta information for rendering the projection picture is inserted in a layer of the container and/or the video stream, and a center of a cut-out position indicated by cut-out position information inserted in a layer of the video stream coincides with a reference point of the projection picture indicated by the meta information for rendering, the reception device further including a control unit that controls: processing of decoding the video stream to obtain the projection picture; processing of rendering the projection picture on the basis of the meta information for rendering to obtain a first display image; processing of cutting out the projection picture on the basis of the cut-out position information to obtain a second display image; and processing of selectively retrieving the first display image or the second display image.

In the present technology, a container including a video stream obtained by encoding image data of a projection picture having a rectangular shape is received by the reception unit. This projection picture is obtained by cutting off a part or the whole of a spherical capture image and performing in-plane packing on the cut-off spherical capture image. Furthermore, meta information for rendering the projection picture is inserted in a layer of the container and/or the video stream. In addition, the center of the cut-out position indicated by cut-out position information inserted in a layer of the video stream coincides with the reference point of the projection picture indicated by the meta information for rendering.

Processing of decoding the video stream to obtain the projection picture, processing of rendering the obtained projection picture on the basis of the meta information for rendering to obtain a first display image, processing of cutting out the projection picture on the basis of the cut-out position information to obtain a second display image, and processing of selectively retrieving the first display image or the second display image are controlled by the control unit.

As described above, in the present technology, the first display image obtained by rendering the projection picture on the basis of the meta information for rendering, or the second display image obtained by cutting out the projection picture on the basis of the cut-out position information is selectively retrieved. Therefore, these two images can be selectively displayed. In this case, the center of the cut-out position indicated by cut-out position information inserted in a layer of the video stream coincides with the reference point of the projection picture indicated by the meta information for rendering, and the first display image and the second display image form a common image.

Effects of the Invention

According to the present technology, it is possible to obtain a common image between a VR-compatible terminal and a VR non-compatible terminal when distributing VR content. Note that the effects described herein are not necessarily limited and any effects described in the present disclosure may be applied.

BRIEF DESCRIPTION OF DRAWINGS

FIG. 6 is a diagram illustrating a structure example of a sequence parameter set network abstraction layer (SPS NAL) unit in high efficiency video coding (HEVC) encoding.

FIG. 9 is a diagram illustrating a structure example of rendering metadata.

FIG. 11 is a diagram illustrating another structure example of the rendering metadata.

FIG. 13 is a diagram illustrating the contents of primary information in the structure examples illustrated in FIGS. 9 and 11.

FIG. 16 is a diagram illustrating "Value" semantics of "SupplementaryDescriptor".

FIG. 25 is a diagram for explaining the specification of a reference point RP (x, y) and the specification of a cut-out position "Conformance_window".

FIG. 27 is a diagram illustrating a structure example of rendering metadata in partitioned cross-cubic.

FIG. 28 is a diagram illustrating another structure example of rendering metadata when the format type is partitioned cross-cubic.

FIG. 29 is a diagram illustrating the contents of primary information in the structure examples illustrated in FIGS. 27 and 28.

FIG. 30 is a diagram illustrating a description example of an MPD file when the format type is partitioned cross-cubic.

FIG. 35 is a diagram illustrating a structure example of a high-definition multimedia interface (HDMI) info frame for rendering metadata.

FIG. 36 is a diagram illustrating a structure example of the HDMI info frame for rendering metadata.

MODE FOR CARRYING OUT THE INVENTION

Modes for carrying out the invention (hereinafter, referred to as "embodiments") will be described below. Note that the description will be given in the following order.
1. Embodiments
2. Modifications 1. Embodiments

[Outline of MPEG-DASH-based Stream Distribution System]

First, an outline of an MPEG-DASH-based stream distribution system to which the present technology can be applied will be described.

Figure 1:
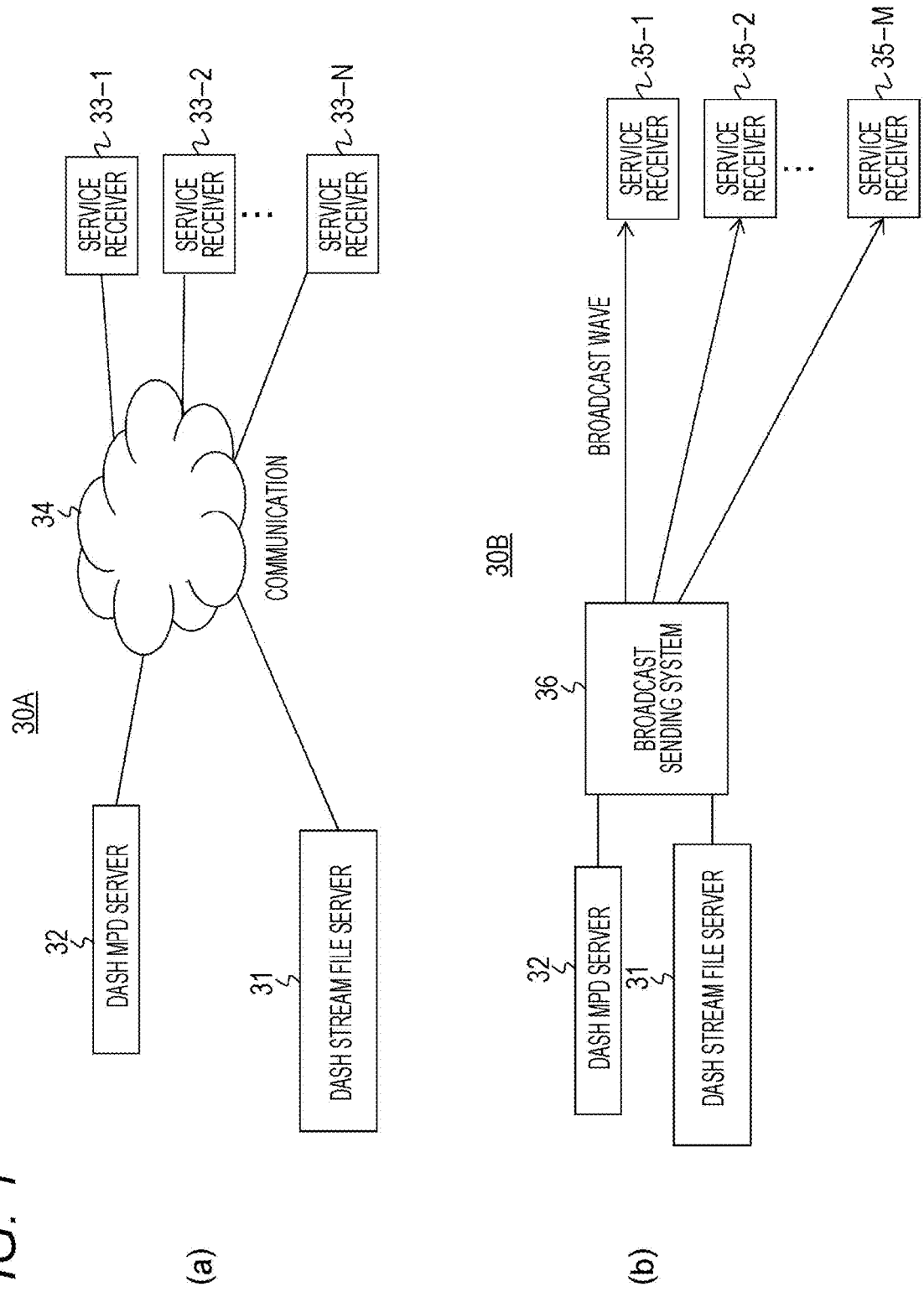
FIG. 1 is a block diagram illustrating a configuration example of a moving picture experts group—dynamic adaptive streaming over hypertext transfer protocol (HTTP) (MPEG-DASH)-based stream distribution system.

FIG. 1(a) illustrates a configuration example of a MPEG-DASH-based stream distribution system 30A. In this configuration example, a media stream and a media presentation description (MPD) file are transmitted through a communication network transfer path (communication transfer path). This stream distribution system 30A has a configuration in which N service receivers 33-1, 33-2, . . . , 33-N are connected to a DASH stream file server 31 and a DASH MPD server 32 via a content delivery network (CDN) 34.

The DASH stream file server 31 generates a stream segment meeting the DASH specifications (hereinafter referred to as "DASH segment" as appropriate) on the basis of media data (video data, audio data, caption data, and the like) of a predetermined piece of content, and sends out a segment according to an HTTP request from the service receiver. This DASH stream file server 31 may be a dedicated streaming server or is sometimes performed by a web server.

Furthermore, in response to a request for a segment of a predetermined stream sent from the service receiver 33 (33-1, 33-2, . . . , 33-N) via the CDN 34, the DASH stream file server 31 transmits the requested segment of the stream to the requesting receiver via the CDN 34. In this case, the service receiver 33 refers to the rate values described in the media presentation description (MPD) file to select a stream with the optimum rate according to the state of the network environment in which the client is located, and makes a request.

The DASH MPD server 32 is a server that generates an MPD file for acquiring a DASH segment generated in the DASH stream file server 31. The MPD file is generated in accordance with content metadata from a content management server (not illustrated) and the address (url) of a segment generated in the DASH stream file server 31. Note that the DASH stream file server 31 and the DASH MPD server 32 may be physically the same server.

In the MPD format, each attribute is described using an element called "Representation" for every single stream such as the video stream and the audio stream. For example, in the MPD file, for each of a plurality of video data streams having different rates, respective rates are described using its individual representations. The service receiver 33 can select an optimum stream according to the state of the network environment in which the service receiver 33 is located, with reference to the value of each rate, as described above.

FIG. 1(b) illustrates a configuration example of a MPEG-DASH-based stream distribution system 30B. In this configuration example, the media stream and the MPD file are transmitted through a radio frequency (RF) transfer path (broadcast transfer path). This stream distribution system 30B is constituted by a broadcast sending system 36 to which the DASH stream file server 31 and the DASH MPD server 32 are connected, and M service receivers 35-1, 35-2, . . . , 35-M.

In the case of this stream distribution system 30B, the broadcast sending system 36 carries a stream segment meeting the DASH specifications (DASH segment) generated by the DASH stream file server 31 and the MPD file generated by the DASH MPD server 32 on the broadcast wave to transmit.

Figure 2:
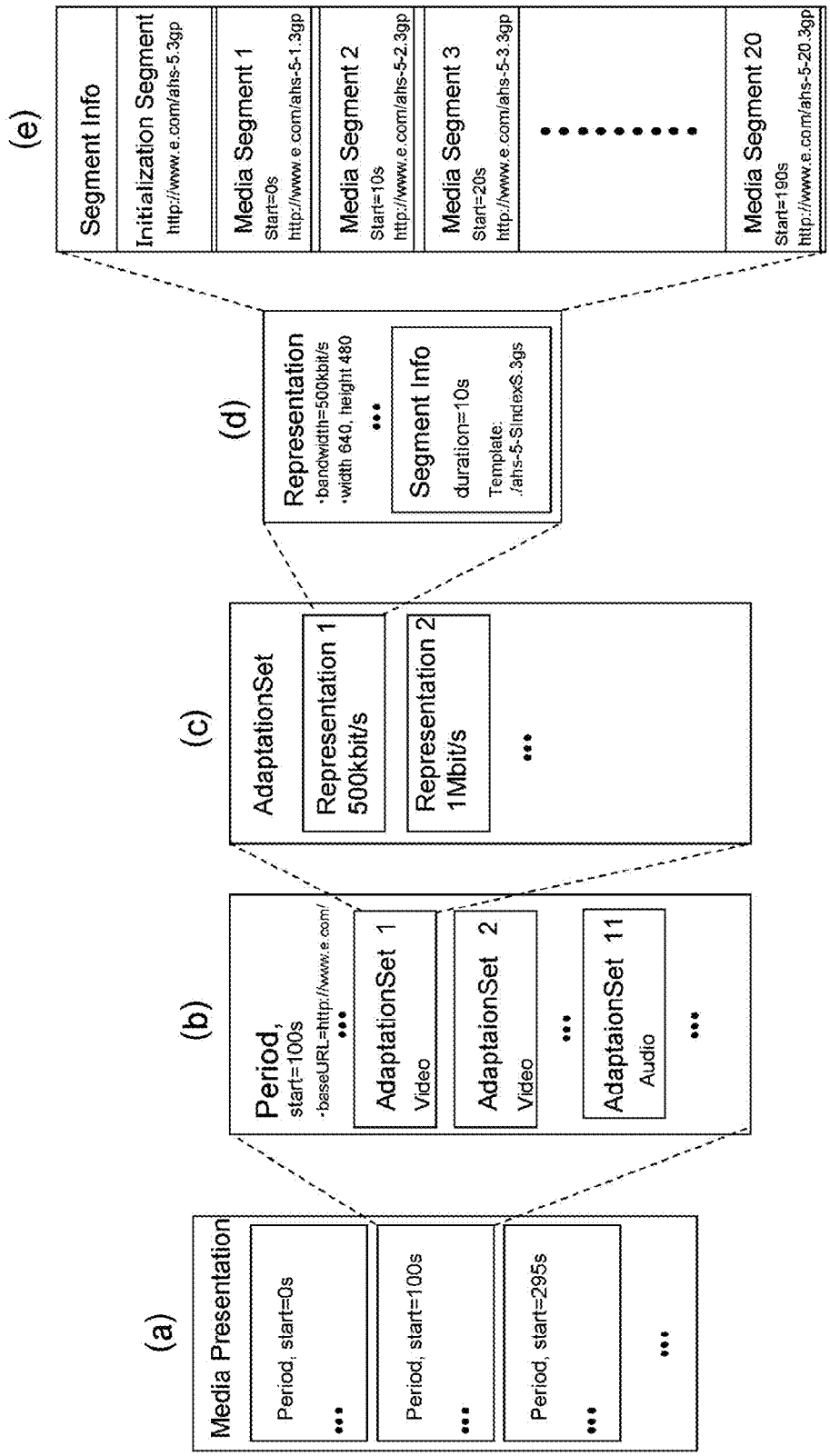
FIG. 2 is a diagram illustrating an example of a relationship between respective structures arranged hierarchically in a media presentation description (MPD) file.

FIG. 2 illustrates an example of a relationship between respective structures arranged hierarchically in the MPD file. As illustrated in FIG. 2(a), a media presentation (Media Presentation) for the whole MPD file contains a plurality of periods (Periods) separated by time intervals. For example, the first period starts from zero seconds, the next period starts from 100 seconds, and so forth.

As illustrated in FIG. 2(b), the period contains a plurality of adaptation sets (AdaptationSet). Each adaptation set depends on variations in media types such as video and audio, and variations in language, viewpoints, and the like even with the same media type. As illustrated in FIG. 2(c), the adaptation set contains a plurality of representations (Representations). Each representation depends on stream attributes, such as variations in rates, for example.

As illustrated in FIG. 2(d), the representation includes segment info (SegmentInfo). This segment info contains, as illustrated in FIG. 2(e), an initialization segment (Initialization Segment), and a plurality of media segments (Media Segments) that describe information on each segment (Segment) obtained by further separating the period. The media segment contains address (url) information and the like for actually acquiring segment data of video, audio, and the like.

Note that stream switching can be freely performed between a plurality of representations included in the adaptation set. With this configuration, a stream with the optimum rate can be selected according to the state of the network environment at the receiving side, and video distribution without interruption is enabled.

[Configuration Example of Transmission/Reception System]

Figure 3:
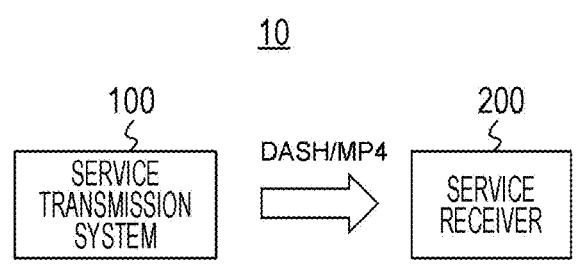
FIG. 3 is a block diagram illustrating a configuration example of a transmission/reception system serving as an embodiment.

FIG. 3 illustrates a configuration example of a transmission/reception system 10 serving as an embodiment. This transmission/reception system 10 is constituted by a service transmission system 100 and a service receiver 200. In this transmission/reception system 10, the service transmission system 100 corresponds to the DASH stream file server 31 and the DASH MPD server 32 of the stream distribution system 30A illustrated in FIG. 1(a) described above. Furthermore, in this transmission/reception system 10, the service transmission system 100 corresponds to the DASH stream file server 31, the DASH MPD server 32, and the broadcast sending system 36 of the stream distribution system 30B illustrated in FIG. 1(b) described above.

In addition, in the transmission/reception system 10, the service receiver 200 corresponds to the service receiver 33 (33-1, 33-2, . . . , 33-N) of the stream distribution system 30A illustrated in FIG. 1(a) described above. Likewise, in this transmission/reception system 10, the service receiver 200 corresponds to the service receiver 35 (35-1, 35-2, . . . , 35-M) of the stream distribution system 30B illustrated in FIG. 1(b) described above.

The service transmission system 100 transmits DASH/MP4, that is, the MPD file as a metafile, and MP4 (ISOBMFF) including a media stream (media segment) of video, audio, or the like, through the communication network transfer path (see FIG. 1(a)) or the RF transfer path (see FIG. 1(b)).

In this embodiment, a video stream obtained by encoding image data of a rectangular projection picture is included as the media stream. The projection picture is obtained by cutting off a part or the whole of a spherical capture image and performing in-plane packing on the cut-off spherical capture image.

Meta information for rendering the projection picture is inserted in a layer of a container and/or the video stream. By inserting the meta information for rendering into the layer of the video stream, the meta information for rendering can be dynamically changed regardless of the container type.

Furthermore, the center of a cut-out position indicated by cut-out position information inserted in a layer of the video stream is adjusted to coincide with the reference point of the projection picture indicated by the meta information for rendering. For example, the projection picture is made up of a plurality of regions including a default region whose position is centered on the reference point, and a position indicated by the cut-out position information is adjusted to coincide with the position of the default region.

The meta information for rendering has information for calculating the reference point. In addition, the meta information for rendering also has backward compatibility information. This backward compatibility information indicates that the center of the cut-out position indicated by the cut-out position information inserted in a layer of the video stream coincides with the reference point of the projection picture indicated by the meta information for rendering.

In the MPD file, identification information indicating the fact that the meta information for rendering is inserted in a layer of the container and/or the video stream, and the backward compatibility information, as well as format type information on the projection picture are inserted.

The service receiver 200 receives above-mentioned MP4 (ISOBMFF) sent from the service transmission system 100 through the communication network transfer path (see FIG. 1(a)) or the RF transfer path (see FIG. 1(b)). The service receiver 200 acquires meta information regarding the video stream from the MPD file. Furthermore, when the service receiver 200 is a VR-compatible terminal, the service receiver 200 acquires, from the MPD file, the identification information indicating the fact that the meta information for rendering is inserted in a layer of the container and/or the video stream, and the backward compatibility information, as well as the format type information on the projection picture.

When the service receiver 200 is a VR-compatible terminal, the service receiver 200 decodes the video stream to obtain a projection picture, and renders the obtained projection picture on the basis of the meta information for rendering to obtain a rendering image (first display image). Note that, in this embodiment, when the service receiver 200 is a VR-compatible terminal, the service receiver 200 further cuts out the projection picture on the basis of the cut-out position information to obtain a cut-out image (second display image), and selectively displays the rendering image or the cut-out image.

In addition, when the service receiver 200 is a VR non-compatible terminal, the service receiver 200 decodes the video stream to obtain a projection picture, and cuts out the obtained projection picture on the basis of the cut-out position information to obtain a cut-out image (second display image). As described above, the center of the cut-out position indicated by the cut-out position information inserted in a layer of the video stream is adjusted to coincide with the reference point of the projection picture indicated by the meta information for rendering. Therefore, the cut-out image is given as being common with the rendering image, and thus a common image can be obtained between the VR-compatible terminal and the VR non-compatible terminal.

Figure 4:
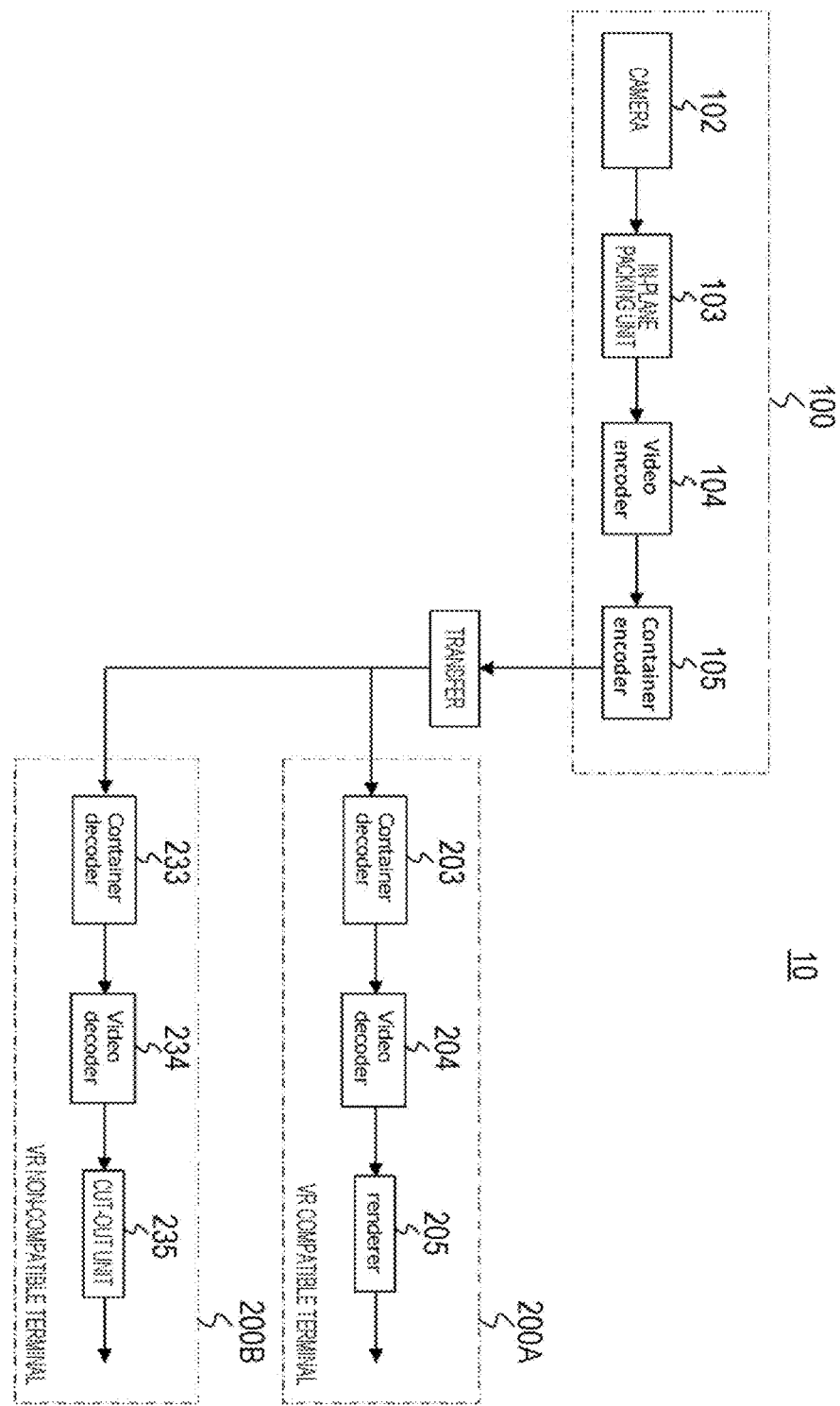
FIG. 4 is a diagram schematically illustrating a configuration example of the entire system of the transmission/reception system.

FIG. 4 schematically illustrates a configuration example of the entire system of the transmission/reception system 10. The service transmission system 100 includes a camera 102, an in-plane packing unit 103, a video encoder 104, and a container encoder 105.

The camera 102 images a subject and obtains image data of a spherical capture image (360° VR image). For example, the camera 102 performs imaging with a back-to-back technique, and obtains, as a spherical capture image, a front image and a back image with an ultra-wide viewing angle having a viewing angle of 180° or more each captured using a fisheye lens.

The in-plane packing unit 103 cuts off a part or the whole of the spherical capture image obtained by the camera 102, and performs in-plane packing on the cut-off spherical capture image to obtain a rectangular projection picture. In this case, equirectangular, cross-cubic, or the like is selected as the format type of the projection picture. Note that the in-plane packing unit performs scaling on the projection picture as necessary to obtain a projection picture having a predetermined resolution.

FIG. 5(a) illustrates an example of the front image and the back image with an ultra-wide viewing angle, as a spherical capture image obtained by the camera 102. FIG. 5(b) illustrates an example of the projection picture obtained by the in-plane packing unit 103. This example is an example of a case where the format type of the projection picture is equirectangular. Furthermore, this example is an example of a case where each image is cut out at the latitudes indicated by the dashed lines illustrated in FIG. 5(a). FIG. 5(c) illustrates an example of the projection picture after scaling.

Referring back to FIG. 4, the video encoder 104 performs encoding such as moving picture experts group 4-advanced video coding (MPEG4-AVC) or HEVC on the image data of the projection picture from the in-plane packing unit 103 to obtain encoded image data, and generates a video stream including the obtained encoded image data. The cut-out position information is inserted in an SPS NAL unit of the video stream. For example, "conformance_window" corresponds to the SPS NAL unit in HEVC encoding, and "frame_crop_offset" corresponds to the SPS NAL unit in MPEG4-AVC encoding.

FIG. 6 illustrates a structure example (Syntax) of the SPS NAL unit in HEVC encoding. A field of "pic_width_in_luma_samples" indicates the resolution (pixel size) in the horizontal direction of the projection picture. A field of "pic_height_in_luma_samples" indicates the resolution (pixel size) in the vertical direction of the projection picture. Then, when "conformance_window_flag" is activated, the cut-out position information is contained. This cut-out position information is configured as offset information with the upper left corner of the projection picture as the base point (0, 0).

A field of "conf_win_left_offset" indicates the left end position of the cut-out position. A field of "conf_win_right_offset" indicates the right end position of the cut-out position. A field of "conf_win_top_offset" indicates the upper end position of the cut-out position. A field of "conf_win_bottom_offset" indicates the lower end position of the cut-out position.

In this embodiment, the center of the cut-out position indicated by this cut-out position information is adjusted to coincide with the reference point of the projection picture. Here, if the center of the cut-out position is assumed as O (p, q), p and q are each represented by the following mathematical formulas.

$$p=(conf\_win\_right\_offset-conf\_win\_left\_offset)*\tfrac{1}{2}+conf\_win\_left\_offset$$

$$q=(conf\_win\_bottom\_offset-conf\_win\_top\_offset)*\tfrac{1}{2}+conf\_win\_top\_offset$$

Figure 7:
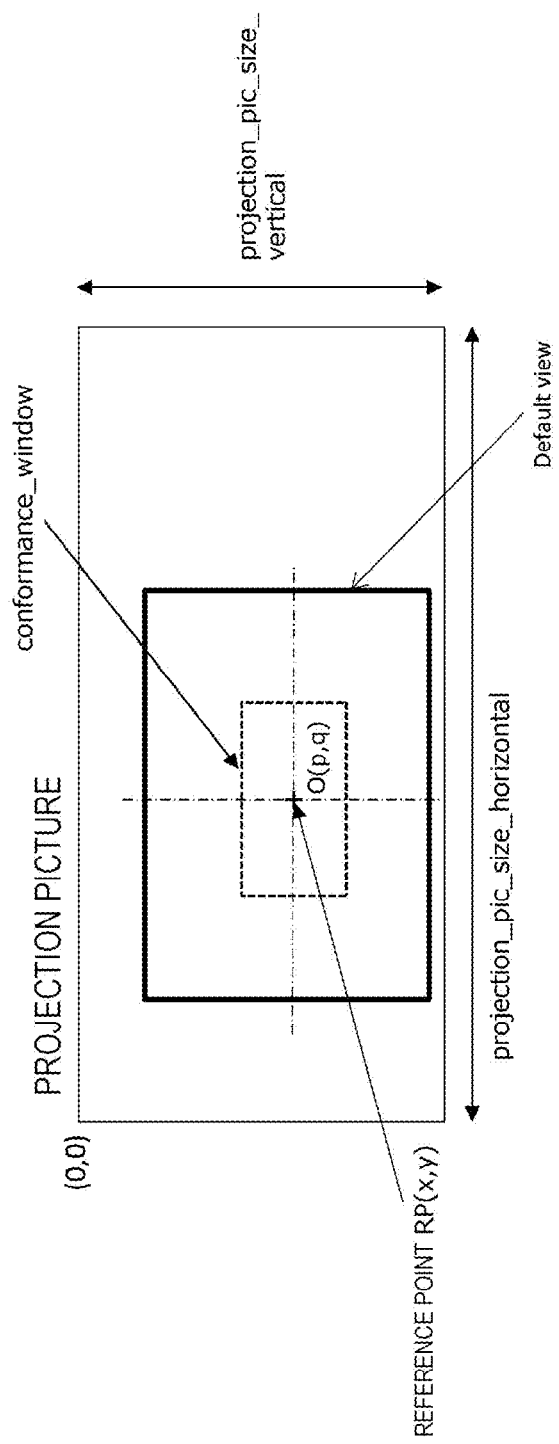
FIG. 7 is a diagram for explaining that a center O (p, q) of a cut-out position is adjusted to coincide with a reference point RP (x, y) of the projection picture.

FIG. 7 illustrates that the center O (p, q) of the cut-out position is adjusted to coincide with the reference point RP (x, y) of the projection picture. In the illustrated example, "projection_pic_size_horizontal" indicates the horizontal pixel size of the projection picture, and "projection_pic_size_vertical" indicates the vertical pixel size of the projection picture. Note that the VR-compatible terminal can obtain a display view (display image) by rendering the projection picture, but the default view is centered on the reference point RP (x, y).

In this case, for example, when the projection picture is made up of a plurality of regions including the default region whose position is centered on the reference point RP (x, y), the position indicated by the cut-out position information is adjusted to coincide with the position of the default region. In this case, the center O (p, q) of the cut-out position indicated by the cut-out position information coincides with the reference point RP (x, y) of the projection picture.

FIG. 8(a) illustrates that the position indicated by the cut-out position information is adjusted to coincide with the position of the default region. In the illustrated example, it is assumed that the projection picture is made up of nine regions from region 0 to region 8, and region 4 is the default region. The VR-compatible terminal can obtain a display view (display image) by rendering the projection picture and can perform changeover of the display view by specifying the region, but the default view corresponds to the default region.

FIG. 8(b) illustrates how the cut-out position information is set on the basis of position information on the default region. The upper end position "conf_win_top_offset" of the cut-out position is adjusted to be equal to the upper end position "proj_reg_top" of the default region. Furthermore, the left end position "conf_win_left_offset" of the cut-out position is adjusted to be equal to the left end position "proj_reg_left" of the default region. Meanwhile, the lower end position "conf_win_bottom_offset" of the cut-out position is adjusted to be equal to a position obtained by the upper end position "proj_reg_top" of the default region plus the vertical size "proj_reg_height" of the default region. Likewise, the right end position "conf_win_right_offset" of the cut-out position is adjusted to be equal to a position obtained by the left end position "proj_reg_left" of the default region plus the horizontal size "proj_reg_width" of the default region.

Referring back to FIG. 4, the video encoder 104 inserts a supplemental enhancement information (SEI) message having rendering metadata (meta information for rendering) into an "SEIs" portion of an access unit (AU). FIG. 9 illustrates a structure example (Syntax) of the rendering metadata (Rendering_metadata). This example is an example in which the position information on the reference point RP (x, y) is transferred. Furthermore, FIG. 11 illustrates another structure example (Syntax) of the rendering metadata (Rendering_metadata). This example is an example in which the position information on the reference point RP (x, y) is not transferred. FIG. 13 illustrates the contents (Semantics) of primary information in the respective structure examples.

First, a structure example of the rendering metadata in FIG. 9 will be described. A 16-bit field of "rendering_metadata_id" is an identifier (ID) that identifies a rendering metadata structure. A 16-bit field of "rendering_metadata_length" indicates the byte size of the rendering metadata structure.

Figure 10:
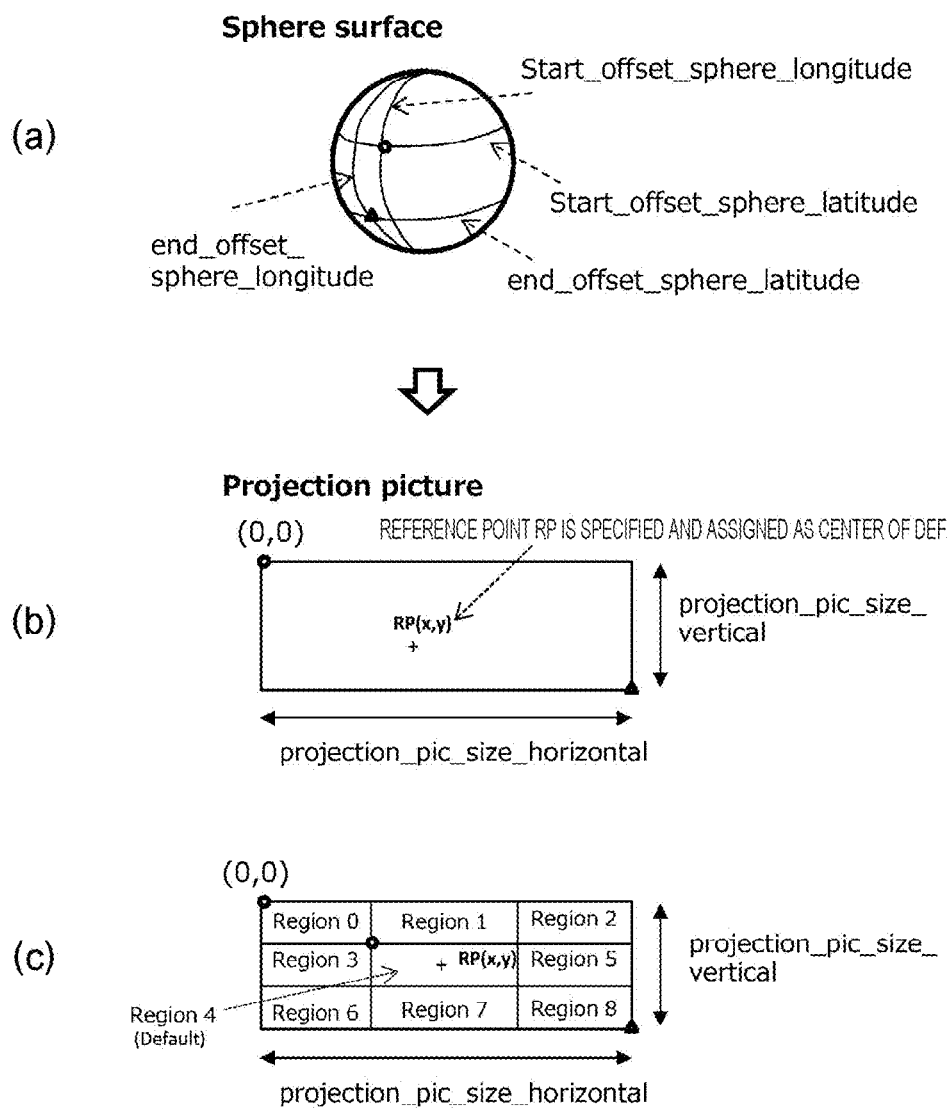
FIG. 10 is a diagram for explaining each piece of information in the structure example illustrated in FIG. 9.

Each 16-bit field of "start_offset_sphere_latitude", "start_offset_sphere_longitude", "end_offset_sphere_latitude", and "end_offset_sphere_longitude" indicates information on a cut-off range in a case where in-plane packing is performed on the spherical capture image (see FIG. 10(a)). The field of "start_offset_sphere_latitude" indicates the latitude (vertical direction) of the start offset for cutting off from the sphere surface. The field of "start_offset_sphere_longitude" indicates the longitude (horizontal direction) of the start offset for cutting off from the sphere surface. The field of "end_offset_sphere_latitude" indicates the latitude (vertical direction) of the end offset for cutting off from the sphere surface. The field of "end_offset_sphere_longitude" indicates the longitude (horizontal direction) of the end offset for cutting off from the sphere surface.

Each 16-bit field of "projection_pic_size_horizontal" and "projection_pic_size_vertical" indicates size information on the projection picture (see FIG. 10(b)). The field of "projection_pic_size_horizontal" indicates the horizontal pixel count from the top-left in the size of the projection picture. The field of "projection_pic_size_vertical" indicates the vertical pixel count from the top-left in the size of the projection picture.

Each 16-bit field of "scaling_ratio_horizontal" and "scaling_ratio_vertical" indicates the scaling ratio from the original size of the projection picture (see FIGS. 5(b) and 5(c)). The field of "scaling_ratio_horizontal" indicates the horizontal scaling ratio from the original size of the projection picture. The field of "scaling_ratio_vertical" indicates the vertical scaling ratio from the original size of the projection picture.

Each 16-bit field of "reference_point_horizontal" and "reference_point_vertical" indicates position information on the reference point RP (x, y) of the projection picture (see FIGS. 10(b) and 10(c)). The field of "reference_point_horizontal" indicates the horizontal pixel position "x" of the reference point RP (x, y). The field of "reference_point_vertical" indicates the vertical pixel position "y" of the reference point RP (x, y).

As illustrated in FIG. 10(b), in a case where no region is set in the projection picture, the reference point RP (x, y) is specified and assigned as the center of the default view. On the other hand, as illustrated in FIG. 10(c), in a case where a region is set in the projection picture, the region position is defined such that the reference point RP (x, y) is aligned with the center of the default region.

A 5-bit field of "format type" indicates the format type of the projection picture. For example, "0" indicates equirectangular, "1" indicates cross-cubic, and "2" indicates partitioned cross-cubic.

A 1-bit field of "backwardcompatible" indicates whether or not backward compatibility is set, that is, whether or not the center O (p, q) of the cut-out position indicated by the cut-out position information inserted in the layer of the video stream is set to coincide with the reference point RP (x, y) of the projection picture. For example, "0" indicates that backward compatibility is not set, and "1" indicates that backward compatibility is set.

An 8-bit field of "number of regions" indicates the number of regions in the projection picture. When the number of regions is two or more, respective fields of "region_id[i]", "start_offset_horizontal_region[i]", "start_offset_vertical_region[i]", "width region[i]", "height_region[i]", and "default_region_flag[i]" are repeatedly prepared as many as the number of regions.

The 8-bit field of "region_id[i]" indicates the identification number of the region. The 16-bit field of "start_offset_horizontal_region[i]" indicates the horizontal start pixel offset of an i-th region. The 16-bit field of "start_offset_vertical_region[i]" indicates the vertical start pixel offset of the i-th region.

The 16-bit field of "width_region[i]" indicates the horizontal width of the i-th region by the number of pixels. The 16-bit field of "height_region[i]" indicates the vertical width of the i-th region by the number of pixels. The 1-bit field of "default_region_flag[i]" indicates whether or not the i-th region is the default region. For example, "0" indicates that the i-th region is not the default region, and "1" indicates that the i-th region is the default region.

Next, a structure example of the rendering metadata in FIG. 11 will be described. A 16-bit field of "rendering_metadata_id" is an identifier (ID) that identifies a rendering metadata structure. A 16-bit field of "rendering_metadata_length" indicates the byte size of the rendering metadata structure.

Figure 12:
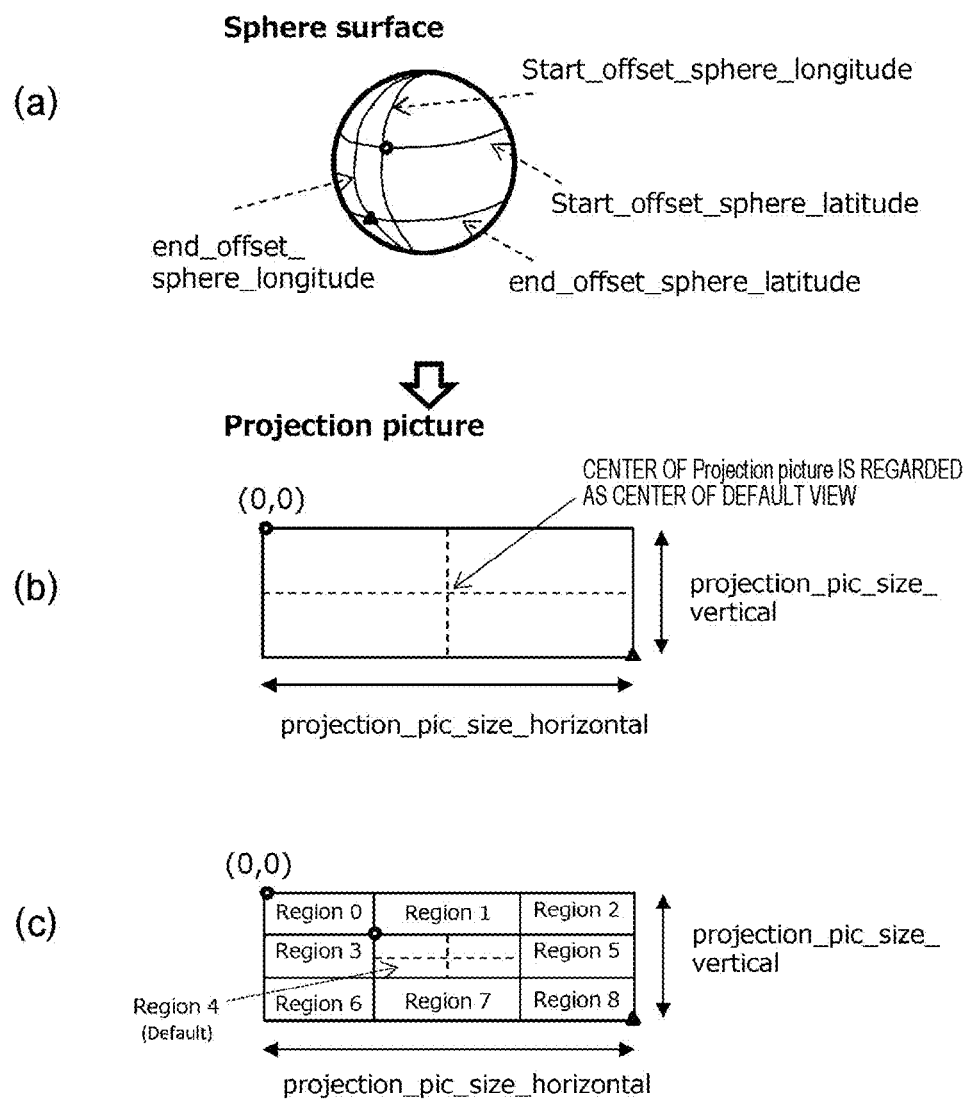
FIG. 12 is a diagram for explaining each piece of information in the structure example illustrated in FIG. 11.

As in the structure example in FIG. 9, each 16-bit field of "start_offset_sphere_latitude", "start_offset_sphere_longitude", "end_offset_sphere_latitude", and "end_offset_sphere_longitude" indicates the cut-off range in a case where in-plane packing is performed on the spherical capture image (see FIG. 12(a)). As in the structure example in FIG. 9, each 16-bit field of "projection_pic_size_horizontal" and "projection_pic_size_vertical" indicates size information on the projection picture (see FIG. 12(b)). As in the structure example in FIG. 9, each 16-bit field of "scaling_ratio_horizontal" and "scaling_ratio_vertical" indicates the scaling ratio from the original size of the projection picture (see FIGS. 5(b) and 5(c)).

A 5-bit field of "format type" indicates the format type of the projection picture. A 1-bit field of "backwardcompatible" indicates whether or not backward compatibility is set. An 8-bit field of "number of regions" indicates the number of regions in the projection picture. When the number of regions is two or more, as in the structure example in FIG. 9, respective fields of "region id[i]", "start_offset_horizontal_region[i]", "start_offset_vertical_region[i]", "width_region[i]", "height_region[i]", and "default_region_flag[i]" are repeatedly prepared as many as the number of regions.

The structure example illustrated in FIG. 11 is obtained by removing each 16-bit field of "reference_point_horizontal" and "reference_point_vertical" indicating position information on the reference point RP (x, y) of the projection picture from the structure example illustrated in FIG. 9.

In a case where no region is set in the projection picture, as illustrated in FIG. 12(b), the center of the projection picture is regarded as the reference point RP (x, y) and hence as the center of the default view. On the other hand, in a case where no region is set in the projection picture, as illustrated in FIG. 12(c), the region position is defined such that the center of the default region is aligned with the reference point RP (x, y).

Referring back to FIG. 4, the container encoder 105 generates a container, here, an MP4 stream, including the video stream generated by the video encoder 104, as a distribution stream STM. In this case, the container encoder 105 inserts the rendering metadata (see FIGS. 9 and 11) into a layer of the container. Note that, in this embodiment, the rendering metadata is inserted into both of a layer of the video stream and a layer of the container; however, it is also conceivable to insert the rendering metadata into only one of these layers. The MP4 distribution stream STM thus obtained by the container encoder 105 is carried on a broadcast wave or a network packet and transmitted to the service receivers 200A and 200B.

Figure 14:
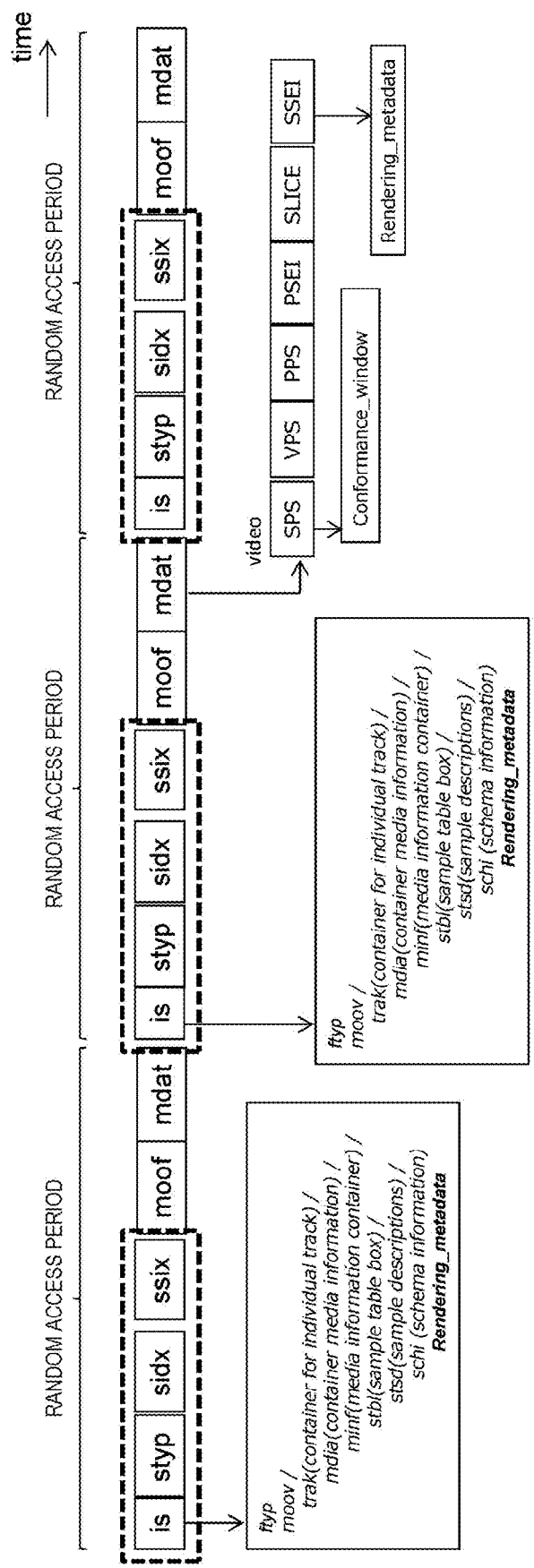
FIG. 14 is a diagram illustrating an example of an MP4 stream as a distribution stream.

FIG. 14 illustrates an example of an MP4 stream as the distribution stream STM. The entire service stream is fragmented and transmitted such that the image and sound is emitted in the middle of transmission, as in general broadcasting or the like. Each random access period has a configuration beginning with an initialization segment (IS), followed by boxes, namely, "styp", "sidx (Segment index box)", "ssix (Sub-segment index box)", "moof (Movie fragment box)" and "mdat (Media data box)".

The initialization segment (IS) has a box structure based on ISO base media file format (ISOBMFF). An "ftyp" box indicating the file type is arranged at the top, and a "moov" box for control is arranged following the "ftyp" box. Although detailed explanation is omitted, a "trak" box, an "mdia" box, an "minf" box, an "stbl" box, an "stsd" box, and an "schi" box are arranged hierarchically in the abovementioned "moov" box, and the rendering metadata (Rendering_metadata) (see FIGS. 9 and 11) is inserted in this "schi" box.

The "styp" box holds segment type information. The "sidx" box holds range information on each track, by which the position of "moof"/"mdat" is indicated, and the position of each sample (picture) in "mdat" is also indicated. The "ssix" box holds track classification information, by which classification into the I/P/B type is made.

The "moof" box holds control information. The "mdat" box holds the actual signal (transfer medium) of video, audio, or the like. A movie fragment is constituted by the "moof" and "mdat" boxes. Since the "mdat" box of one movie fragment holds a piece obtained by fragmenting the transfer medium (breaking the transfer medium into pieces), the control information held in the "moof" box is control information regarding the held piece.

In the "mdat" box of each movie fragment, encoded image data (access unit) of the projection picture is arranged for a predetermined number of pictures, for example, one group of pictures (GOP). Here, each access unit is constituted by NAL units such as "VPS", "SPS", "PPS", "PSEI", "SLICE", and "SSEI". Note that "VPS" and "SPS" are inserted in the top picture of the GOP, for example.

Information on "conformance_window" as the cut-out position information is inserted into the SPS NAL unit (see FIG. 6). Furthermore, an SEI message having the rendering metadata (Rendering_metadata) (see FIGS. 9 and 11) is inserted as a NAL unit of "SSEI".

Figure 15:
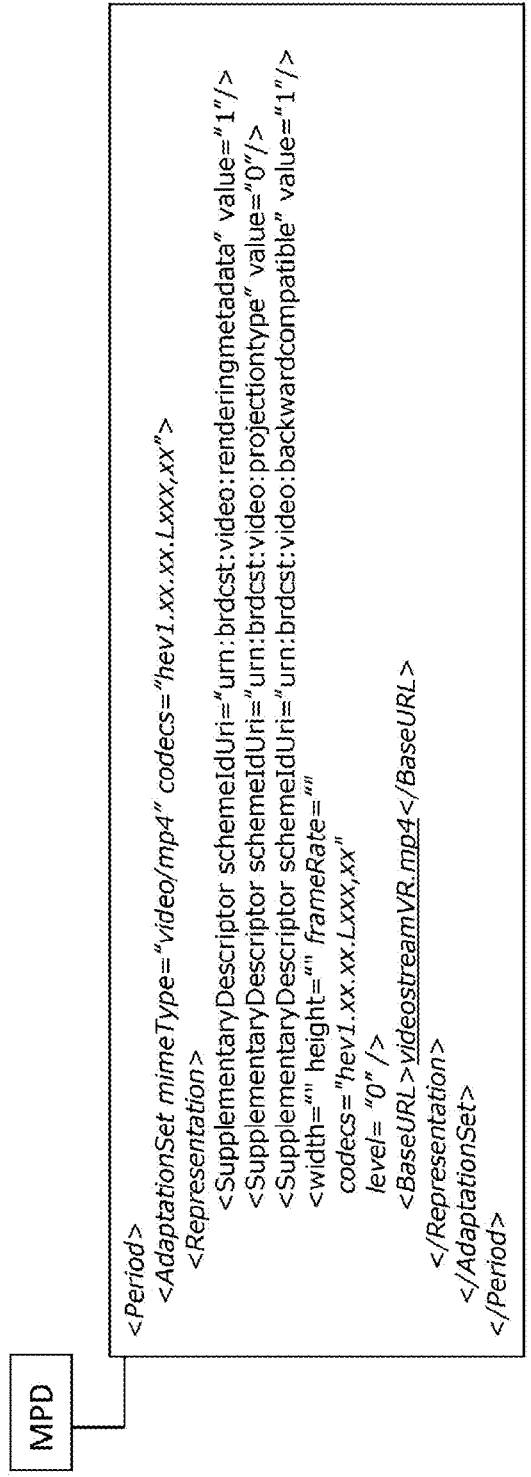
FIG. 15 is a diagram illustrating a description example of the MPD file.

FIG. 15 illustrates a description example of the MPD file. Here, for simplification of explanation, an example in which only information regarding the video stream is described is indicated; actually, however, information regarding other media streams is also described. FIG. 16 illustrates "Value" semantics of "SupplementaryDescriptor".

The description of "<AdaptationSet mimeType="video/mp4" codecs="hev1.xx.xx.Lxxx,xx"" indicates that there is an adaptation set (AdaptationSet) for the video stream, the video stream is supplied in the MP4 file structure, and there is an HEVC video stream (encoded image data) of Lxxx level.

This MPD file contains a representation (Representation) corresponding to the video stream. In this representation, the description of "<SupplementaryDescriptor schemeIdUri="urn:brdcst:video:renderingmetadata" value="1"/>" indicates the presence of rendering metadata (Rendering_metadata).

Furthermore, the description of "<SupplementaryDescriptor schemeIdUri="urn:brdcst:video:projectiontype" value="0"/>" indicates that the format type of the projection picture is equirectangular. The description of "<SupplementaryDescriptor schemeIdUri="urn:brdcst:video:backwardcompatible" value="1"/>" indicates that backward compatibility is set, that is, the center O (p, q) of the cut-out position indicated by the cut-out position information inserted in the layer of the video stream is set to coincide with the reference point RP (x, y) of the projection picture.

In addition, the descriptions of "width=" " height=" " frameRate=" "", "codecs="hev1.xx.xx.Lxxx,xx"", "level="0"" indicate the types of the resolution, frame rate, and codec, and further indicate that the level "0" is given as tag information and the level of the video stream (encoded stream) is "Lxxx". Additionally, the description of "<BaseURL>videostreamVR.mp4</BaseURL>" indicates the location destination of this video stream as "videostreamVR.mp4".

Referring back to FIG. 4, the service receiver 200A, which is a VR-compatible terminal, includes a container decoder 203, a video decoder 204, and a renderer 205. The container decoder 203 retrieves a video stream from the received MP4 distribution stream STM and sends the retrieved video stream to the video decoder 204.

The video decoder 204 performs decoding processing on the video stream retrieved by the container decoder 203 to obtain a projection picture (image data). The renderer 205 performs rendering processing on the projection picture (image data) on the basis of the rendering metadata (meta information for rendering) inserted in a layer of the container and/or video stream, to obtain a rendering image (image data).

In this case, the renderer 205 generates a rendering image corresponding to the default view centered on the reference point RP (x, y) of the projection picture, and can also generate a rendering image corresponding to another view according to a user operation or a user's action. For example, in a case where the projection picture is made up of a plurality of regions, a rendering image of the default view corresponding to the default region is generated, and additionally a rendering image of a view corresponding to another region specified by the user can be generated.

Note that, although not illustrated, the service receiver 200A can also obtain a cut-out image (image data) from the projection picture (image data) by performing cut-out processing using the cut-out position information inserted in the layer of the video stream. Then, the service receiver 200A can selectively display the rendering image or the cut-out image as a display image according to a user's changeover operation.

Meanwhile, the service receiver 200B, which is a VR non-compatible terminal, includes a container decoder 233, a video decoder 234, and a cut-out unit 235. The container decoder 233 retrieves a video stream from the received MP4 distribution stream STM and sends the retrieved video stream to the video decoder 234.

The video decoder 234 performs decoding processing on the video stream retrieved by the container decoder 233 to obtain a projection picture (image data). The cut-out unit 235 obtains a cut-out image (image data) from the projection picture (image data) by performing cut-out processing using the cut-out position information inserted in the layer of the video stream. That is, the service receiver 200B can display this cut-out image.

FIG. 17(a) illustrates an example of a projection picture, which is an output of the video decoders 204 and 234. Here, the center O (p, q) of the cut-out position "conformance_window" indicated by the cut-out position information inserted in the layer of the video stream is adjusted to coincide with the reference point RP (x, y) of the projection picture.

FIG. 17(b) illustrates that the service receiver 200A, which is a VR-compatible terminal, can selectively display the rendering image or the cut-out image obtained by processing the projection picture. Here, the rendering image is obtained by performing rendering processing on the projection picture. Additionally, the default rendering image corresponds to the default view centered on the reference point RP (x, y) of the projection picture. Furthermore, the cut-out image is obtained by cutting out the area of the cut-out position "conformance window" from the projection picture.

FIG. 17(c) illustrates that the service receiver 200B, which is a VR non-compatible terminal, can display the cut-out image. This cut-out image is obtained by cutting out the area of the cut-out position "conformance window" from the projection picture.

As described above, since the center O (p, q) of the cut-out position "conformance_window" coincides with the reference point RP (x, y) of the projection picture, the rendering image corresponding to the default view displayed on the service receiver 200A and the cut-out image displayed on the service receiver 200B form a common image. That is, a common image can be obtained between the service receiver 200A, which is a VR-compatible terminal, and the service receiver 200B, which is a VR non-compatible terminal.

"Configuration Example of Service Transmission System"

Figure 18:
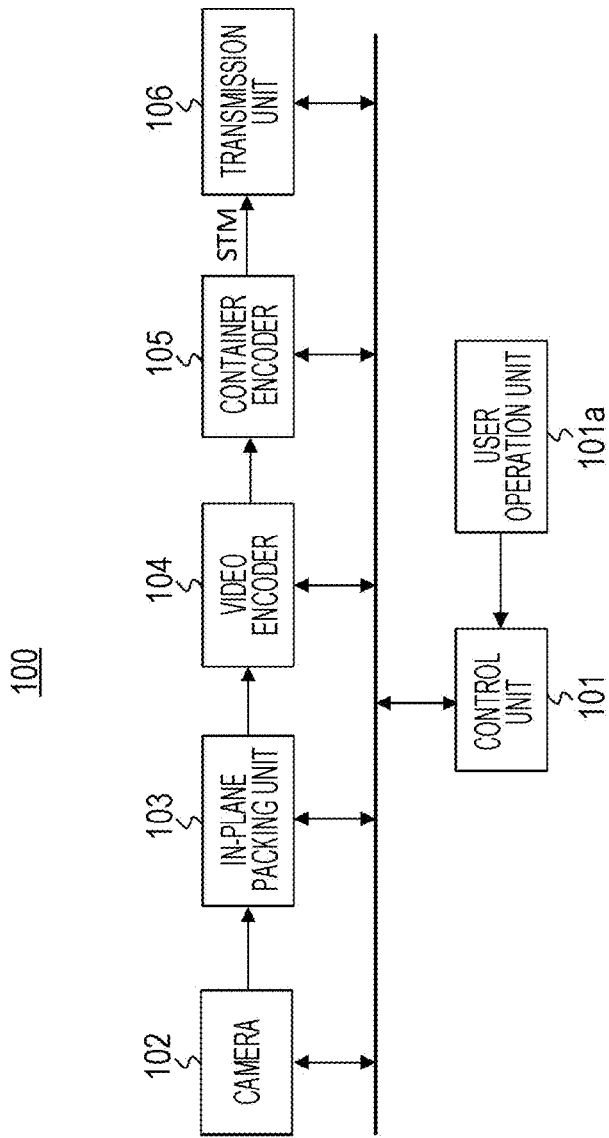
FIG. 18 is a block diagram illustrating a configuration example of a service transmission system.

FIG. 18 illustrates a configuration example of the service transmission system 100. This service transmission system 100 includes a control unit 101, a user operation unit 101a, the camera 102, the in-plane packing unit 103, the video encoder 104, the container encoder 105, and a transmission unit 106.

The control unit 101 includes a central processing unit (CPU) in the configuration thereof and controls actions of respective members in the service transmission system 100 on the basis of a control program. The user operation unit 101a is a keyboard, a mouse, a touch panel, a remote controller, or the like for the user to perform various operations.

The camera 102 images a subject and obtains image data of a spherical capture image (360° VR image). For example, the camera 102 performs imaging with the back-to-back technique, and obtains, as a spherical capture image, a front image and a back image with an ultra-wide viewing angle having a viewing angle of 180° or more each captured using a fisheye lens (see FIG. 5 (a)).

The in-plane packing unit 103 cuts off a part or the whole of the spherical capture image obtained by the camera 102, and performs in-plane packing on the cut-off spherical capture image to obtain a rectangular projection picture (see FIG. 5(b)). In this case, equirectangular, cross-cubic, or the like is selected as the format type of the projection picture. Note that the in-plane packing unit performs scaling on the projection picture as necessary to obtain a projection picture having a predetermined resolution (see FIG. 5(c)).

The video encoder 104 performs encoding such as HEVC, for example, on the image data of the projection picture from the in-plane packing unit 103 to obtain encoded image data, and generates a video stream including the obtained encoded image data. The cut-out position information is inserted in the SPS NAL unit of the video stream (see information on "conformance_window" in FIG. 6).

Here, the center O (p, q) of the cut-out position indicated by the cut-out position information is adjusted to coincide with the reference point RP (x, y) of the projection picture (see FIG. 7). In this case, for example, when the projection picture is made up of a plurality of regions including the default region whose position is centered on the reference point RP (x, y), the position indicated by the cut-out position information is adjusted to coincide with the position of the default region (see FIG. 8). In this case, the center O (p, q) of the cut-out position indicated by the cut-out position information coincides with the reference point RP (x, y) of the projection picture.

Furthermore, the video encoder 104 inserts the SEI message having rendering metadata (meta information for rendering) into the "SEIs" portion of the access unit (AU). In the metadata for rendering, information on the cut-off range in a case where in-plane packing is performed on the spherical capture image, information on the scaling ratio from the original size of the projection picture, information on the format type of the projection picture, information indicating whether or not backward compatibility is set to make the center O (p, q) of the cut-out position coincident with the reference point RP (x, y) of the projection picture, and the like are inserted (see FIGS. 9 and 11).

In addition, there are cases where the position information on the reference point RP (x, y) is inserted into the rendering metadata (see FIG. 9) and where the position information is not inserted into the rendering metadata (see FIG. 11). In a case where the position information is not inserted, the center of the projection picture is regarded as the reference point RP (x, y) (see FIG. 12(b)), or the center of the default region is regarded as the reference point RP (x, y) (see FIG. 12(c)).

The container encoder 105 generates a container, here, an MP4 stream, including the video stream generated by the video encoder 104, as a distribution stream STM (see FIG. 14). In this case, the container encoder 105 inserts the rendering metadata (see FIGS. 9 and 11) into a layer of the container. The transmission unit 106 carries the MP4 distribution stream STM obtained by the container encoder 105 on a broadcast wave or a network packet and transmits the carried distribution stream STM to the service receivers 200A and 200B.

"Configuration Example of Service Receiver (VR-Compatible Terminal)"

Figure 19:
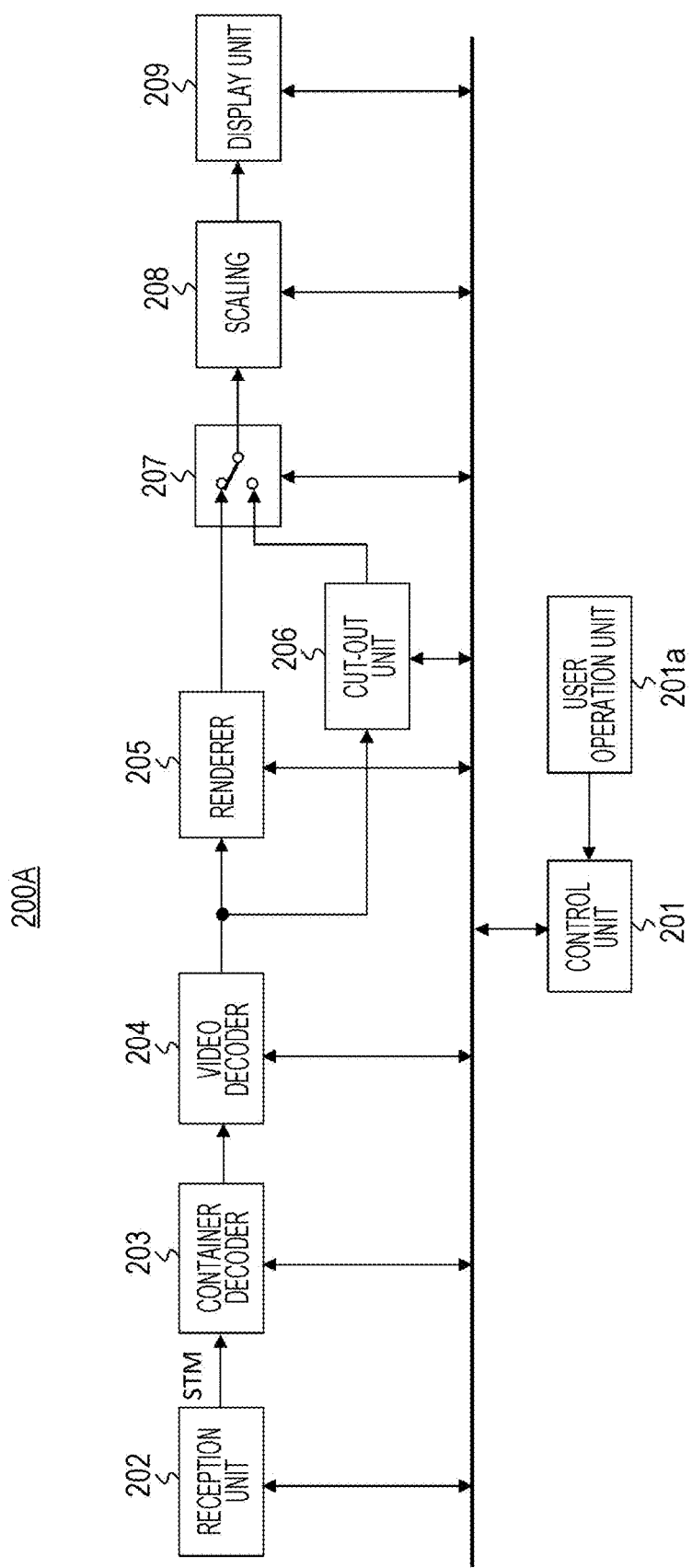
FIG. 19 is a block diagram illustrating a configuration example of a service receiver (VR-compatible terminal).

FIG. 19 illustrates a configuration example of the service receiver 200A, which is a VR-compatible terminal. This service receiver 200A includes a control unit 201, a user operation unit 201a, a reception unit 202, the container decoder 203, the video decoder 204, the renderer 205, a cut-out unit 206, a changeover switch 207, a scaling unit 208, and a display unit 209.

The control unit 201 includes a central processing unit (CPU) in the configuration thereof and controls actions of respective members in the service receiver 200A on the basis of a control program. The user operation unit 201a is a keyboard, a mouse, a touch panel, a remote controller, or the like for the user to perform various operations, and user operation information is supplied to the control unit 231. Furthermore, the control unit 231 is also supplied with sensor information from a sensor that senses a user's action (not illustrated). The reception unit 202 receives the MP4 distribution stream STM carried on a broadcast wave or a network packet and sent from the service transmission system 100.

Under the control of the control unit 201, the container decoder (multiplexer) 203 retrieves a video stream from the MP4 distribution stream STM received by the reception unit 202, on the basis of information in the "moof" block and the like, and sends the retrieved video stream to the video decoder 204. The container decoder 203 also retrieves information in the "moov" block and the like from the distribution stream STM and sends the retrieved information to the control unit 201. The rendering metadata (see FIGS. 9 and 11) is contained as one piece of information in the "moov" block.

The video decoder 204 performs decoding processing on the video stream retrieved by the container decoder 203 to obtain a projection picture (image data). Furthermore, the video decoder 204 extracts a parameter set and the SEI message inserted in the video stream retrieved by the container decoder 203, and sends the extracted items to the control unit 201. This extracted information includes information on the cut-out position "conformance_window" inserted in the SPS NAL packet, and also the SEI message having the rendering metadata (see FIGS. 9 and 11).

Under the control of the control unit 201, the renderer 205 performs rendering processing on the projection picture (image data) on the basis of the rendering metadata to obtain a rendering image (image data).

In this case, the renderer 205 generates a rendering image corresponding to the default view centered on the reference point RP (x, y) of the projection picture, and can also generate a rendering image corresponding to another view according to a user operation or a user's action. For example, in a case where the projection picture is made up of a plurality of regions, a rendering image of the default view corresponding to the default region is generated, and additionally a rendering image of a view corresponding to another region specified by the user can be generated.

Under the control of the control unit 201, the cut-out unit 206 performs cut-out processing on the projection picture using the cut-out position information inserted in the layer of the video stream to obtain a cut-out image (image data). The changeover switch 207 selectively retrieves and outputs the rendering image (image data) obtained by the renderer 205 or the cut-out image (image data) obtained by the cut-out unit 206 according to sensor information or a user's changeover operation, under the control of the control unit 201.

The scaling unit 208 performs scaling processing on the image (image data) retrieved by the changeover switch 207 such that the retrieved image matches the size of the display unit 209. The display unit 209 displays the rendering image or the cut-out image that has been subjected to the scaling processing.

Figure 20:
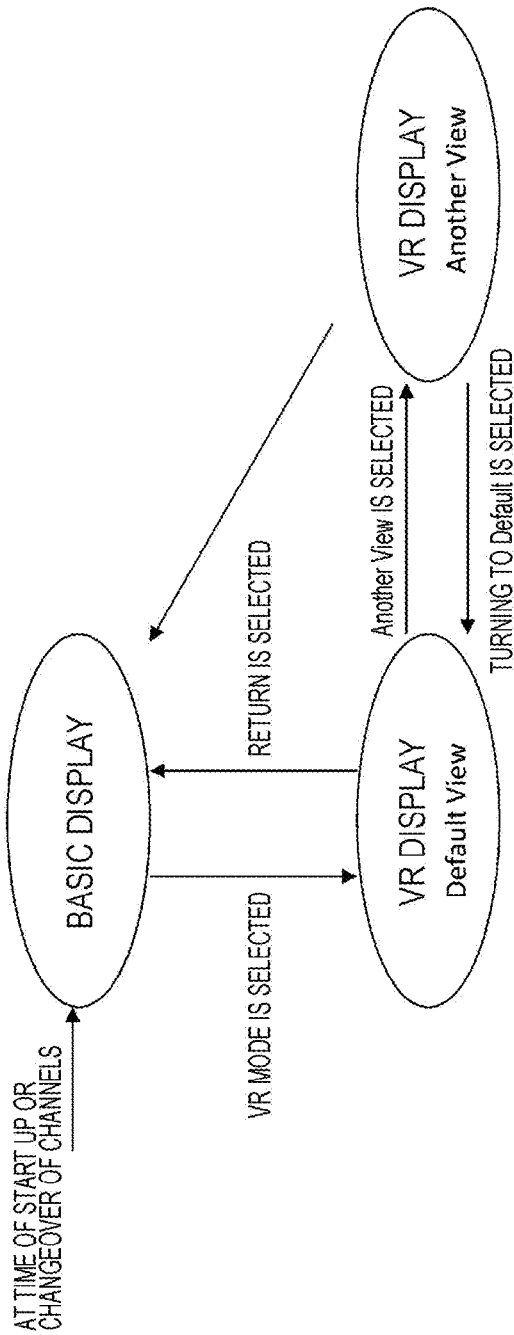
FIG. 20 is a diagram illustrating a display changeover sequence in the service receiver (VR-compatible terminal).

FIG. 20 illustrates a display changeover sequence in the service receiver 200A. This display changeover sequence is an example, and the display changeover sequence is not limited to this example.

The illustrated display changeover sequence contains three states when the display state is roughly divided: a basic display state for displaying the cut-out image, a VR display (default view) state for displaying the rendering image corresponding to the default view (or the default region), and a VR display (another view) state.

At the time of start up or changeover of channels, the basic display state is placed. In this case, a cut-out image (image data) is obtained by the cut-out unit 206, and the obtained cut-out image (image data) is retrieved by the changeover switch 207 and supplied to the display unit 209 through the scaling unit 208; then, the cut-out image is displayed.

In this basic display state, when a VR mode is selected by a user operation, the VR display (default view) state is placed. In this case, first, the rendering image (image data) corresponding to the default view (or the default region) is obtained by the renderer 205, and the obtained rendering image (default view) is retrieved by the changeover switch 207 and supplied to the display unit 209 through the scaling unit 208; then, the rendering image corresponding to the default view (or the default region) is displayed.

Furthermore, in this basic display state, when another view (or another region) is selected by a user operation or a user's action, the VR display (another view) state is placed. In this case, the rendering image (image data) corresponding to another view (or region) that has been selected is obtained by the renderer 205, and the obtained rendering image (another view) is retrieved by the changeover switch 207 and supplied to the display unit 209 through the scaling unit 208; then, the rendering image corresponding to another view (or region) is displayed.

In addition, when turning to default is selected in this VR display (another view) state, the VR display (default view) state is placed. Furthermore, when return is selected by a user operation in this VR display (default view) state, the basic display state is placed. Note that it is also possible to shift directly to the basic display from the VR display (another view) state by the user's return operation.

"Configuration Example of Service Receiver (VR Non-Compatible Terminal)"

Figure 21:
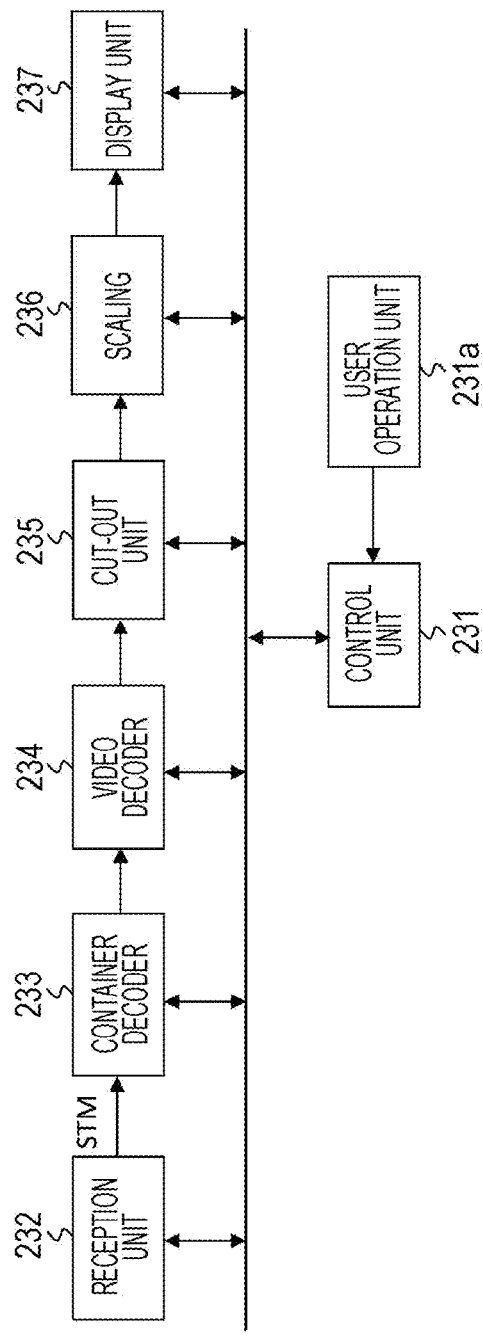
FIG. 21 is a block diagram illustrating a configuration example of a service receiver (VR non-compatible terminal).

FIG. 21 illustrates a configuration example of the service receiver 200B, which is a VR non-compatible terminal. This service receiver 200B includes the control unit 231, a user operation unit 231a, a reception unit 232, the container decoder 233, the video decoder 234, the cut-out unit 235, a scaling unit 236, and a display unit 237.

The control unit 231 includes a central processing unit (CPU) in the configuration thereof and controls actions of respective members in the service receiver 200B on the basis of a control program. The user operation unit 231a is a keyboard, a mouse, a touch panel, a remote controller, or the like for the user to perform various operations, and user operation information is supplied to the control unit 231. Furthermore, the control unit 231 is also supplied with sensor information from a sensor that senses a user's action (not illustrated). The reception unit 232 receives the MP4 distribution stream STM carried on a broadcast wave or a network packet and sent from the service transmission system 100.

Under the control of the control unit 231, the container decoder (multiplexer) 233 retrieves a video stream from the MP4 distribution stream STM received by the reception unit 232, on the basis of information in the "moof" block and the like, and sends the retrieved video stream to the video decoder 234. The container decoder 233 also retrieves information in the "moov" block and the like from the distribution stream STM and sends the retrieved information to the control unit 231.

The video decoder 234 performs decoding processing on the video stream retrieved by the container decoder 233 to obtain a projection picture (image data). Furthermore, the video decoder 234 extracts a parameter set and the SEI message inserted in the video stream retrieved by the container decoder 233, and sends the extracted items to the control unit 231. This extracted information includes information on the cut-out position "conformance_window" inserted in the SPS NAL packet.

Under the control of the control unit 231, the cut-out unit 235 performs cut-out processing on the projection picture using the cut-out position information inserted in the layer of the video stream to obtain a cut-out image (image data). The scaling unit 236 performs scaling processing on the cut-out image (image data) obtained by the cut-out unit 235 such that the obtained cut-out image matches the size specified in the display unit 237. The display unit 237 displays the cut-out image that has been subjected to the scaling processing.

As described above, in the transmission/reception system 10 illustrated in FIG. 3, the center O (p, q) of the cut-out position "conformance_window" indicated by the cut-out position information inserted in the layer of the video stream is adjusted to coincide with the reference point RP (x, y) of the projection picture. Therefore, the rendering image corresponding to the default view displayed on the service receiver 200A, which is a VR-compatible terminal, and the cut-out image displayed on the service receiver 200B, which is a VR non-compatible terminal, form a common image; accordingly, it becomes possible to obtain a common image between the VR-compatible terminal and the VR non-compatible terminal.

2. Modifications

"Application to MPEG-2 TS and MMT"

Note that, in the above embodiment, an example in which the container is in MP4 (ISOBMFF) has been illustrated. However, the container is not limited to MP4, and the present technology can be similarly applied to containers in other formats such as MPEG-2 TS and MMT.

For example, in the case of MPEG-2 TS, the container encoder 105 of the service transmission system 100 illustrated in FIG. 4 generates a transport stream (Transport Stream) including a video stream.

At this time, the container encoder 105 inserts a rendering metadata descriptor (Rendering metadata descriptor) including the rendering metadata (see FIGS. 9 and 11) into a video elementary stream loop corresponding to each encoded stream in a program map table (PMT).

Figure 22:
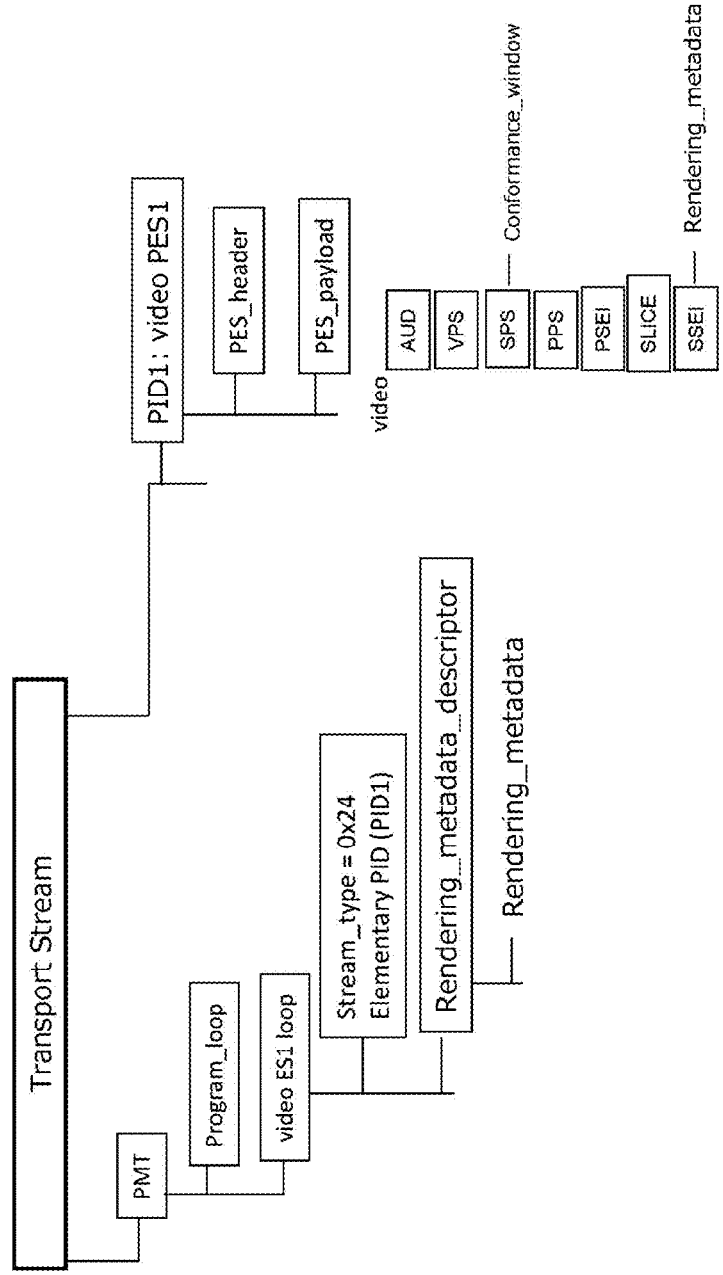
FIG. 22 is a diagram illustrating a configuration example of a transport stream.

FIG. 22 illustrates a configuration example of the transport stream. This configuration example contains a packetized elementary stream (PES) packet "video PES1" for a video stream identified by PID1. The payload of this PES packet "video PES1" includes an access unit (encoded image data) of each picture.

In the access unit (encoded image data) containerized by the PES packet "video PES1", information on the cut-out position "Conformance_window" is inserted in "SPS". Furthermore, the SEI message having the rendering metadata (see FIGS. 9 and 11) is inserted in "SSEI".

In addition, the PMT contains a video elementary stream loop (video ES1 loop) corresponding to the PES packet "video PES1". Information such as a stream type and a packet identifier (PID) is arranged in the video elementary stream loop (video ES1 loop) in correspondence to the video stream (video PES1), and also a descriptor that describes information associated with this video streams is arranged therein. This stream type is assumed as "0x24" indicating the video stream. Furthermore, the rendering metadata descriptor including the rendering metadata (see FIGS. 9 and 11) is inserted as one of the descriptors.

Meanwhile, for example, in the case of MMT, the container encoder 105 of the service transmission system 100 illustrated in FIG. 4 generates an MMT stream (MMT Stream) including a video stream.

At this time, the container encoder 105 inserts a rendering metadata descriptor (Rendering metadata descriptor) including the rendering metadata (see FIGS. 9 and 11) into a video asset loop corresponding to an extended video stream in an MMT package table (MPT).

Figure 23:
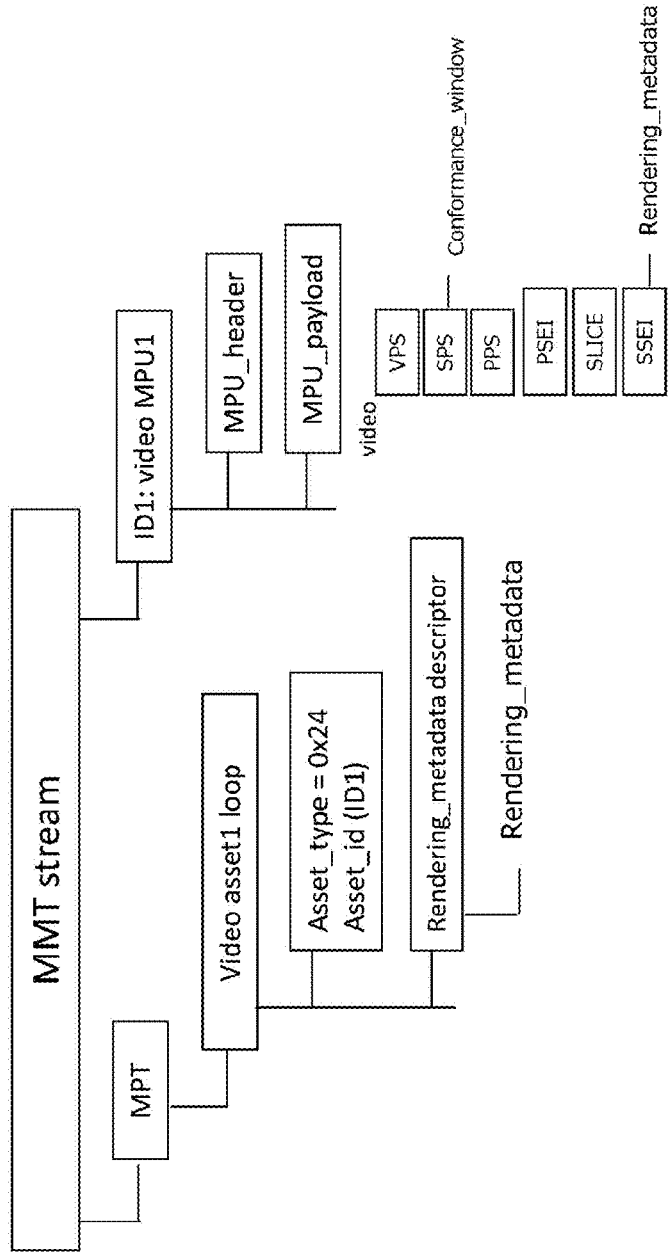
FIG. 23 is a diagram illustrating a configuration example of an MMT stream.

FIG. 23 illustrates a configuration example of the MMT stream. This configuration example contains a media processing unit (MPU) packet "video MPU1" of a video stream identified by ID1. The payload of this MPU packet "video MPU1" includes an access unit (encoded image data) of each picture.

In the access unit (encoded image data) containerized by the MPU packet "video MPU1", information on the cut-out position "Conformance_window" is inserted in "SPS". Furthermore, the SEI message having the rendering metadata (see FIGS. 9 and 11) is inserted in "SSEI".

In addition, the MPT contains a video asset loop (video asset1 loop) corresponding to the MPU packet "video MPU1". Information such as a stream type and a packet identifier (PID) is arranged in the video asset loop (video asset1 loop) in correspondence to the video stream (video MPU1), and also a descriptor that describes information associated with this video streams is arranged therein. This asset type is assumed as "0x24" indicating the video stream. Furthermore, the rendering metadata descriptor including the rendering metadata is inserted as one of the descriptors.

Figure 5:
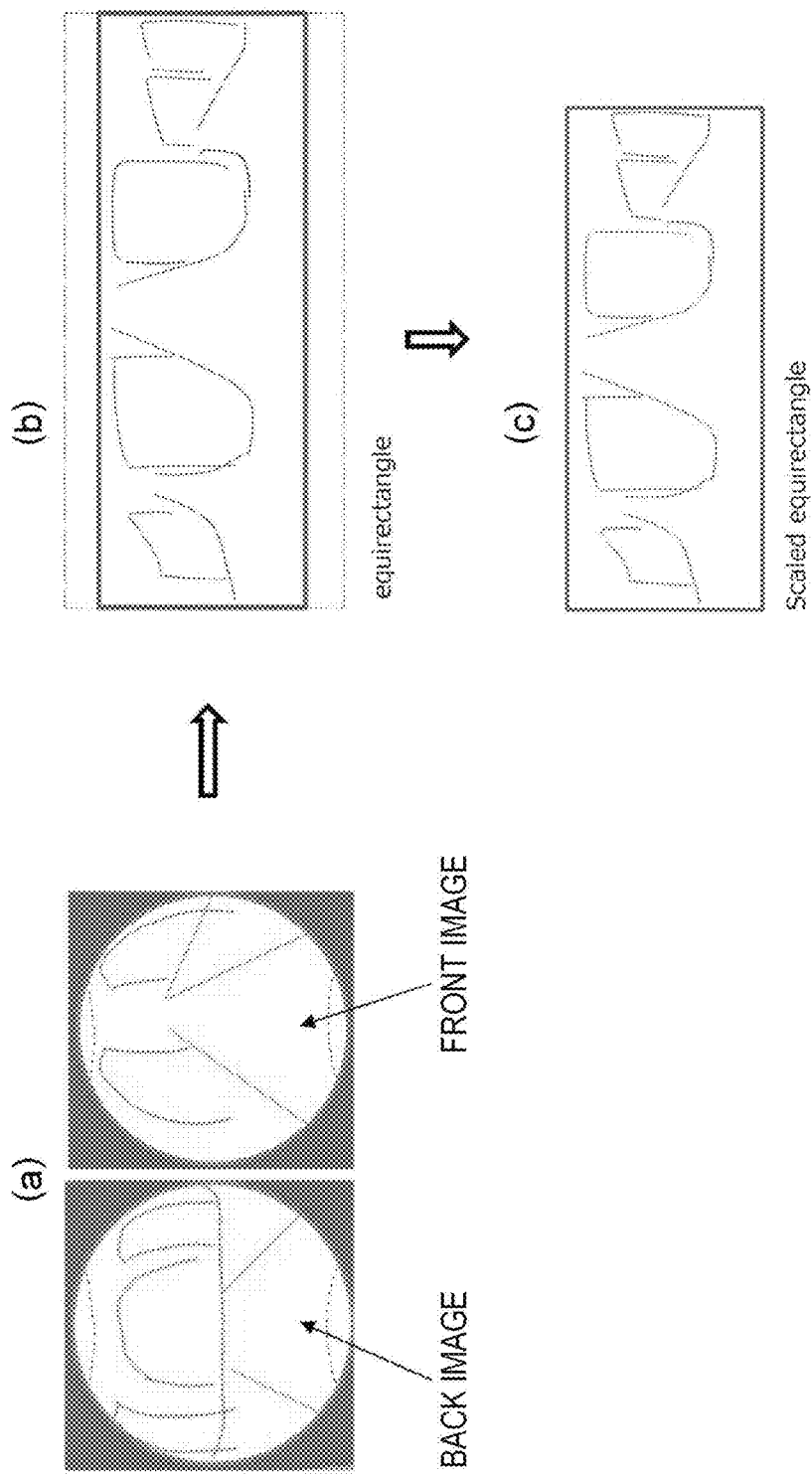
FIG. 5 is a diagram for explaining in-plane packing for obtaining a projection picture from a spherical capture image.
Figure 8:
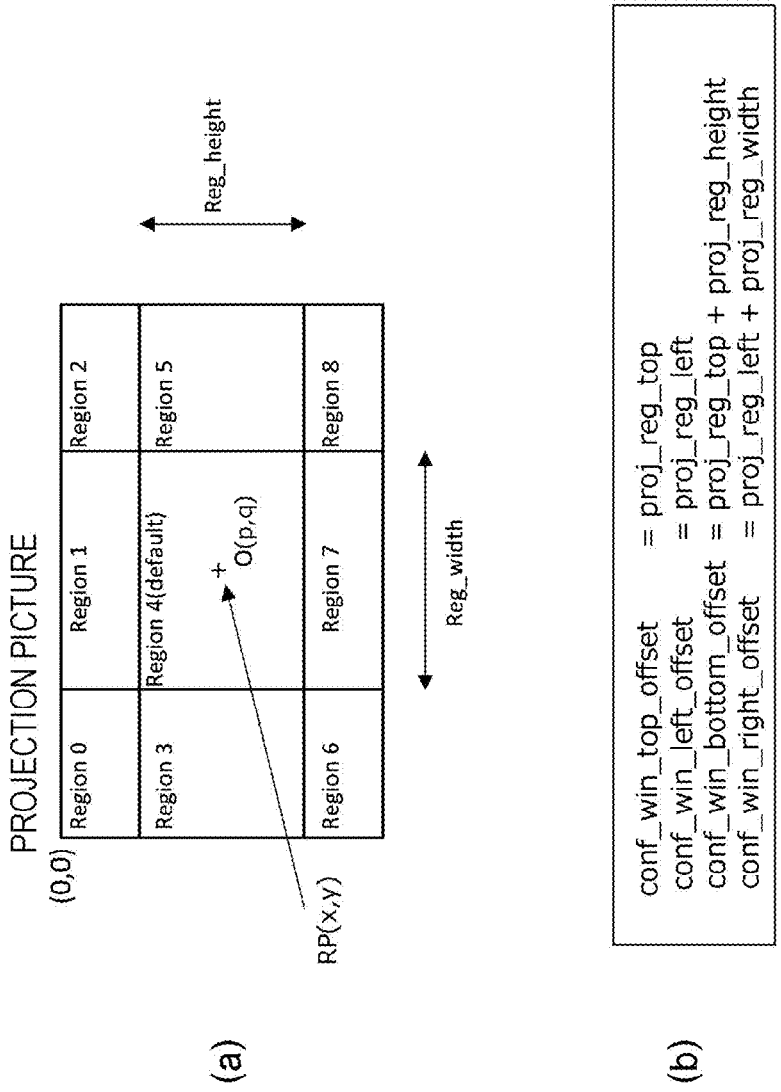
FIG. 8 is a diagram for explaining that a position indicated by cut-out position information is adjusted to coincide with a position of a default region.

Additionally, in the above-described embodiment, the description is based on the assumption that the format type of the projection picture is equirectangular (see FIGS. 5, 7, and 8). As described above, the format type of the projection picture is not limited to equirectangular, and may be other formats.

"Case where Format Type is Cross-Cubic"

Figure 24:
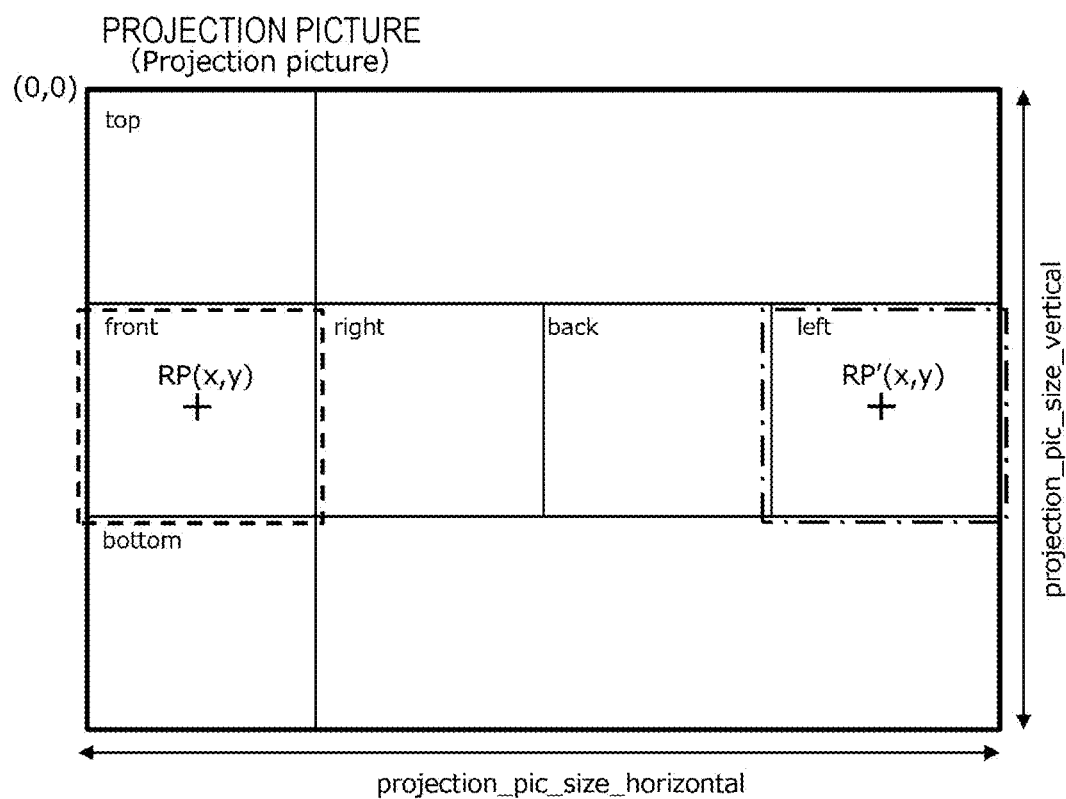
FIG. 24 is a diagram illustrating a projection picture whose format type is cross-cubic.

FIG. 24 illustrates a projection picture whose format type is cross-cubic. This projection picture contains six views of "top", "front", "bottom", "right", "back", and "left".

FIG. 25(a) illustrates the specification of the reference point RP (x, y) and the specification of the cut-out position "Conformance_window" in case 1 where the "front" view (indicated by a dashed rectangle in FIG. 24) is the default view.

In this case, x and y of the reference point RP (x, y) are specified as in the following mathematical formulas.

$x = \text{projection\_pic\_size\_horizontal} * 1/8$ $y = \text{projection\_pic\_size\_vertical} * 1/2$ Furthermore, in this case, the cut-out position "Conformance_window" is specified as in the following mathematical formulas such that the center of the cut-out position coincides with the reference point RP (x, y).

$\text{conf\_win\_left\_offset} = 0$ $\text{conf\_win\_right\_offset} = \text{projection\_pic\_size\_horizontal} * 1/4$ $\text{conf\_win\_top\_offset} = \text{projection\_pic\_size\_vertical} * 1/3$ $\text{conf\_win\_bottom\_offset} = \text{projection\_pic\_size\_vertical} * 2/3$ FIG. 25(b) illustrates the specification of the reference point RP' (x, y) and the specification of the cut-out position "Conformance_window" in case 2 where the "left" view (indicated by a dashed-dotted rectangle in FIG. 24) is the default view.

In this case, x and y of the reference point RP' (x, y) are specified as in the following mathematical formulas.

$x = \text{projection\_pic\_size\_horizontal} * 7/8$ $y = \text{projection\_pic\_size\_vertical} * 1/2$ Furthermore, in this case, the cut-out position "Conformance_window" is specified as in the following mathematical formulas such that the center of the cut-out position coincides with the reference point RP' (x, y).

$\text{conf\_win\_left\_offset} = \text{projection\_pic\_size\_horizontal} * 3/4$ $\text{conf\_win\_right\_offset} = \text{projection\_pic\_size\_horizontal}$ $\text{conf\_win\_top\_offset} = \text{projection\_pic\_size\_vertical} * 1/3$ $\text{conf\_win\_bottom\_offset} = \text{projection\_pic\_size\_vertical} * 2/3$ In the case of the above-mentioned projection picture with the format type of cross-cubic, each of the six views "top", "front", "bottom", "right", "back", and "left" can also be handled as a region. In that case, instead of transferring information on the reference point RP (x, y), one of the views is assigned as the default region, and the center of the default region is regarded as the reference point RP (x, y); then, the cut-out position "conformance_window" is specified in a manner described above.

"Case where Format Type is Partitioned Cross-Cubic"

Furthermore, in the above-described embodiment, an example is indicated in which the entire image data of the projection picture is transferred in one MP4 stream (one track) (see FIG. 14). However, for example, in a case where the format type of the projection picture is cross-cubic, the projection image contains an area having substantially no image data (see FIG. 24), which causes use of an unnecessary transfer band.

Therefore, it is conceivable to improve the transfer efficiency by dividing the six views (regions) of cross-cubic, namely, "top", "front", "bottom", "right", "back", and "left" into multiple partitions, and performing transfer in multiple MP4 streams (multiple tracks).

Figure 26:
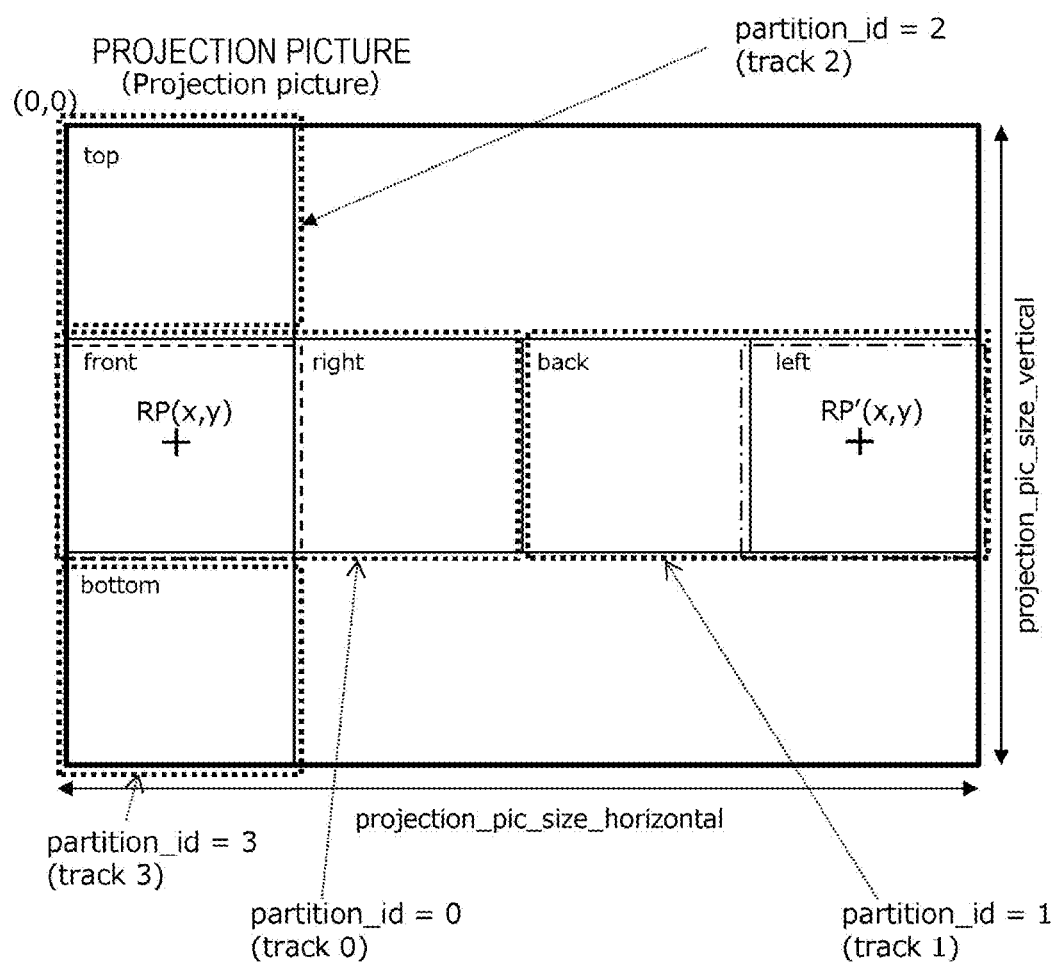
FIG. 26 is a diagram illustrating an example in which six views (regions) of cross-cubic, namely, "top", "front", "bottom", "right", "back", and "left" are divided into four partitions and transferred in four MP4 streams.

FIG. 26 illustrates an example in which the six views (regions) of cross-cubic, namely, "top", "front", "bottom", "right", "back", and "left" are divided into four partitions and transferred in four MP4 streams.

In this case, the views (regions) of "front" and "right" are included in partition 0 (Partition 0) identified by "partition id=0", the views (regions) of "back" and "left" are included in partition 1 (Partition 1) identified by "partition id=1", the view (region) of "top" is included in partition 2 (Partition 2) identified by "partition id=2", and the view (region) of "bottom" is included in partition 3 (Partition 3) identified by "partition id=3".

Note that, in this example, as in the example illustrated in FIG. 24, it is assumed that the reference point RP (x, y) is defined at the center of the view (region) of "front", and the reference point RP' (x, y) is defined at the center of the view (region) of "front".

FIG. 27 illustrates a structure example (Syntax) of rendering metadata (meta information for rendering) inserted in each MP4 stream. This example is an example in which the position information on the reference point RP (x, y) is transferred. FIG. 28 illustrates another structure example (Syntax) of the rendering metadata (Rendering_metadata). This example is an example in which the position information on the reference point RP (x, y) is not transferred. FIG. 29 illustrates the contents (Semantics) of primary information in the respective structure examples.

The rendering metadata structure examples in FIGS. 27 and 28 correspond to the rendering metadata structure examples in FIGS. 9 and 11 for the case of transfer by one MP4 stream described above, respectively, and differ in that information regarding partitions is further inserted.

An 8-bit field of "partition id" indicates partition (Partition) identification information. A 16-bit field of "partition_start_offset_horizontal" indicates the horizontal partition start position by the number of pixels from the initial point (0, 0) of the projection picture. A 16-bit field of "partition_start_offset_vertical" indicates the vertical partition start position by the number of pixels from the initial point (0, 0) of the projection picture. A 16-bit field of "partition_end_offset_horizontal" indicates the horizontal partition end position by the number of pixels from the initial point (0, 0) of the projection picture. A 16-bit field of "partition_end_offset_vertical" indicates the vertical partition end position by the number of pixels from the initial point (0, 0) of the projection picture.

Note that, in the rendering metadata structure examples illustrated in FIGS. 27 and 28, the 5-bit field of "format_type" has a value "2" indicating partitioned cross-cubic.

FIG. 30 illustrates a description example of the MPD file. Here, for simplification of explanation, an example in which only information regarding the video stream is described is indicated; actually, however, information regarding other media streams is also described. This MPD file contains an adaptation set (AdaptationSet) corresponding to each of four MP4 streams (tracks). Note that, in the illustrated example, only two adaptation sets (AdaptationSet) are illustrated to simplify the drawing.

In each adaptation set, the description of "<AdaptationSet mimeType="video/mp4" codecs="hev1.xx.xx.Lxxx,xx"" indicates that there is an adaptation set (AdaptationSet) for the video stream, the video stream is supplied in the MP4 file structure, and there is an HEVC-encoded video stream (encoded image data).

The description of "<SupplementaryDescriptor schemeIdUri="urn:brdcst:video:formattype" value="2"/>" indicates that the format type of the projection picture is partitioned cross-cubic. The description of "<SupplementaryDescriptor schemeIdUri "urn:brdcst:video:partitionid" value/>" indicates partition identification information.

The description of "<SupplementaryDescriptor schemeIdUri="urn:brdcst:video:partitionstartpositionhorizontal" value/>" indicates the horizontal partition start position. The description of "<SupplementaryDescriptor schemeIdUri="urn:brdcst:video:partitionstartpositionvertical" value/>" indicates the vertical partition start position. The description of "<SupplementaryDescriptor schemeIdUri="urn:brdcst:video:partitionendpositionhorizontal" value/>" indicates the horizontal partition end position. The description of "<SupplementaryDescriptor schemeIdUri="urn:brdcst:video:partitionendpositionvertical" value/>" indicates the vertical partition end position.

The description of "<SupplementaryDescriptor schemeIdUri="urn:brdcst:video:renderingmetadata" value="1"/>" indicates the presence of rendering metadata (Rendering_metadata). The description of "<SupplementaryDescriptor schemeIdUri="urn:brdcst:video:backward-compatible" value="1"/>" indicates that backward compatibility is set, that is, the center O (p, q) of the cut-out position indicated by the cut-out position information inserted in the layer of the video stream is set to coincide with the reference point RP (x, y) of the projection picture.

Furthermore, each adaptation set contains a representation (Representation) corresponding to the video stream. In this representation, the descriptions of "width=" " height=" " frameRate=" "", "codecs="hev1.xx.xx.Lxxx,xx"", "level="0"" indicate the types of the resolution, frame rate, and codec, and further indicate that the level "0" is given as tag information. Additionally, the description of "<BaseURL>videostreamVR.mp4</BaseURL>" indicates the location destination of this video stream as "videostreamVR.mp4".

Figure 31:
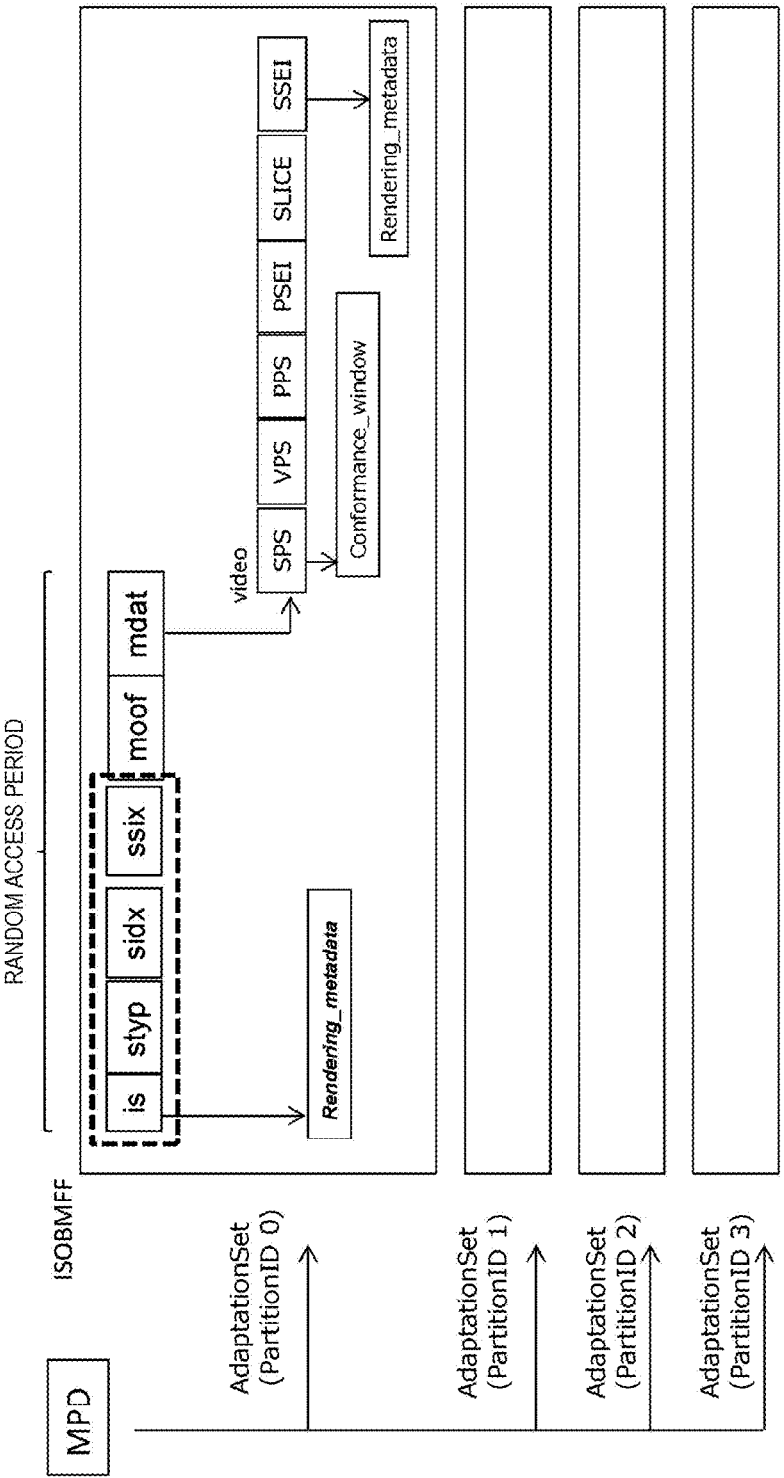
FIG. 31 is a diagram schematically illustrating MP4 streams (tracks) corresponding to four partitions.

FIG. 31 schematically illustrates MP4 streams (tracks) corresponding to the four partitions. Similarly, each MP4 stream has a configuration in which each random access period begins with an initialization segment (IS), followed by boxes, namely, "styp", "sidx (Segment index box)", "ssix (Sub-segment index box)", "moof (Movie fragment box)" and "mdat (Media data box)".

The initialization segment (IS) has a box structure based on ISO base media file format (ISOBMFF). An "ftyp" box indicating the file type is arranged at the top, and a "moov" box for control is arranged following the "ftyp" box. Although detailed explanation is omitted, a "trak" box, an "mdia" box, an "minf" box, an "stbl" box, an "stsd" box, and an "schi" box are arranged hierarchically in the abovementioned "moov" box, and the rendering metadata (Rendering_metadata) (see FIGS. 27 and 28) is inserted in this "schi" box.

The "styp" box holds segment type information. The "sidx" box holds range information on each track, by which the position of "moof"/"mdat" is indicated, and the position of each sample (picture) in "mdat" is also indicated. The "ssix" box holds track classification information, by which classification into the I/P/B type is made.

The "moof" box holds control information. The "mdat" box holds the actual signal (transfer medium) of video, audio, or the like. A movie fragment is constituted by the "moof" and "mdat" boxes. Since the "mdat" box of one movie fragment holds a piece obtained by fragmenting the transfer medium (breaking the transfer medium into pieces), the control information held in the "moof" box is control information regarding the held piece.

In the "mdat" box of each movie fragment, encoded image data (access unit) of the projection picture is arranged for a predetermined number of pictures, for example, one group of pictures (GOP). Here, each access unit is constituted by NAL units such as "VPS", "SPS", "PPS", "PSEI", "SLICE", and "SSEI". Note that "VPS" and "SPS" are inserted in the top picture of the GOP, for example.

Information on "conformance_window" as the cut-out position information is inserted into the SPS NAL unit (see FIG. 6). Furthermore, an SEI message having the rendering metadata (Rendering_metadata) (see FIGS. 27 and 28) is inserted as a NAL unit of "SSEI".

Note that the above description indicates an example in which the six views (regions) of cross-cubic, namely, "top", "front", "bottom", "right", "back", and "left" are divided into four partitions and transferred in four MP4 streams (see FIG. 26). However, the number of partitions and the way of dividing into the adopted number of partitions are not limited to this example. For example, it is also conceivable to treat each of the six views (regions) of cross-cubic, namely, "top", "front", "bottom", "right", "back", and "left", as a partition and transfer these partitions in six MP4 streams.

Furthermore, the improvement of the transfer efficiency by dividing the six views (regions) of cross-cubic, namely, "top", "front", "bottom", "right", "back", and "left" into multiple partitions, and performing transfer in multiple MP4 streams (multiple tracks) is not limited to a case where container is in MP4 (ISOBMFF), and can also be similarly applied to containers of other formats such as MPEG-2 TS and MMT.

Figure 32:
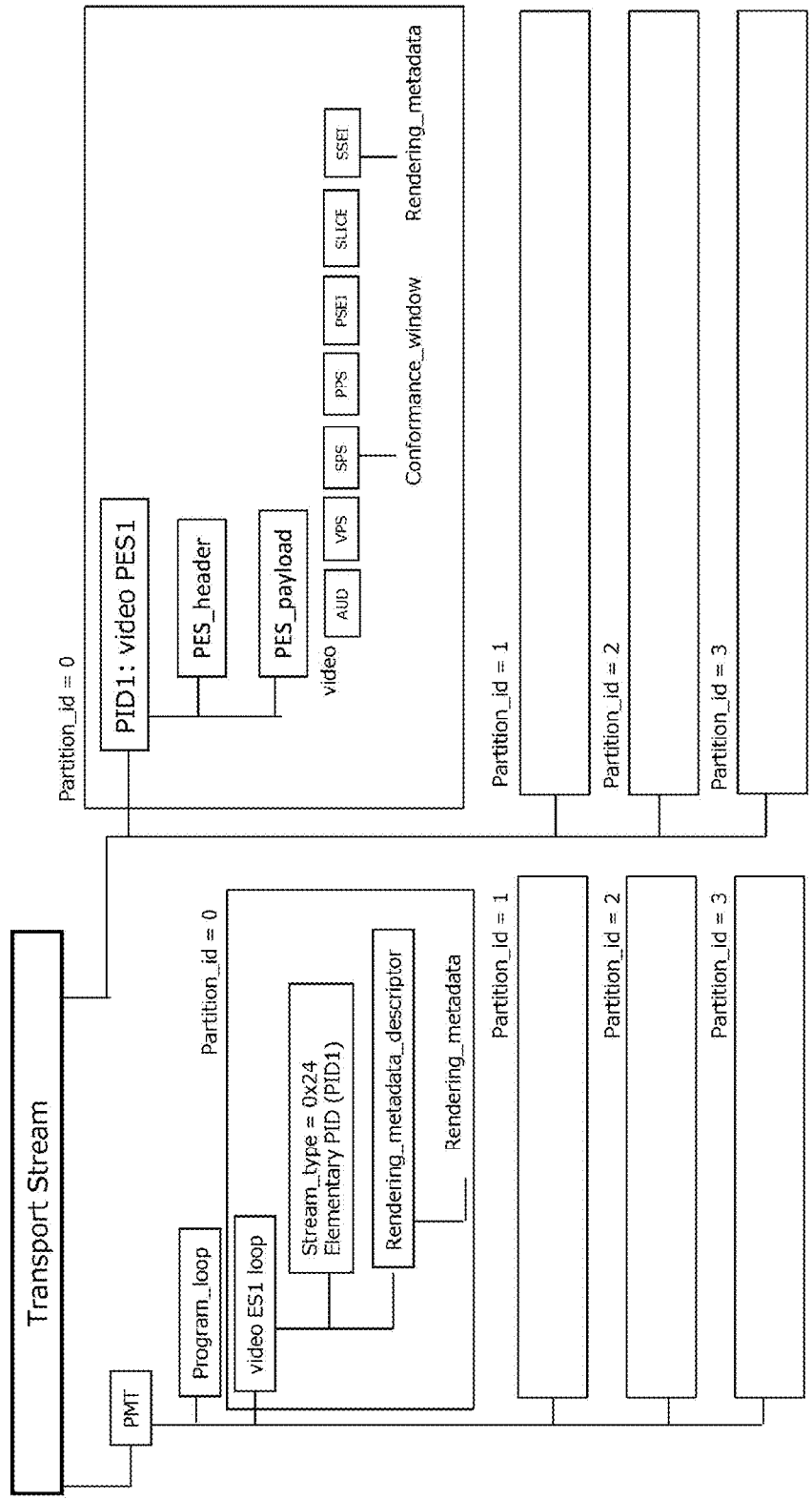
FIG. 32 is a diagram illustrating a configuration example of a transport stream.

FIG. 32 illustrates a configuration example of a transport stream in a case where partitioning is applied to MPEG-2 TS. This configuration example illustrates an example in which six views (regions) of cross-cubic, namely, "top", "front", "bottom", "right", "back", and "left" are divided into four partitions (see FIG. 26) with partition IDs (partition id) 0 to 3, and transferred in four video streams for each partition.

This configuration example contains a PES packet "video PES" for each of the four video streams. Note that, in the illustrated example, only the part of a PES packet "video PES1" corresponding to partition 1 (Partition_id=1) is illustrated in detail. The payload of each PES packet "video PES" includes an access unit (encoded image data) of each picture.

In the access unit (encoded image data) containerized by the PES packet "video PES", information on the cut-out position "Conformance_window" is inserted in "SPS". Furthermore, the SEI message having the rendering metadata (see FIGS. 27 and 28) is inserted in "SSEI".

In addition, the PMT contains a video elementary stream loop (video ES1 loop) corresponding to the PES packet "video PES1" of each of the four video streams. Information such as a stream type and a packet identifier (PID) is arranged in each video elementary stream loop (video ES loop) in correspondence to the video stream (video PES), and also a descriptor that describes information associated with this video streams is arranged therein. Furthermore, the rendering metadata descriptor including the rendering metadata (see FIGS. 27 and 28) is inserted as one of the descriptors.

Figure 33:
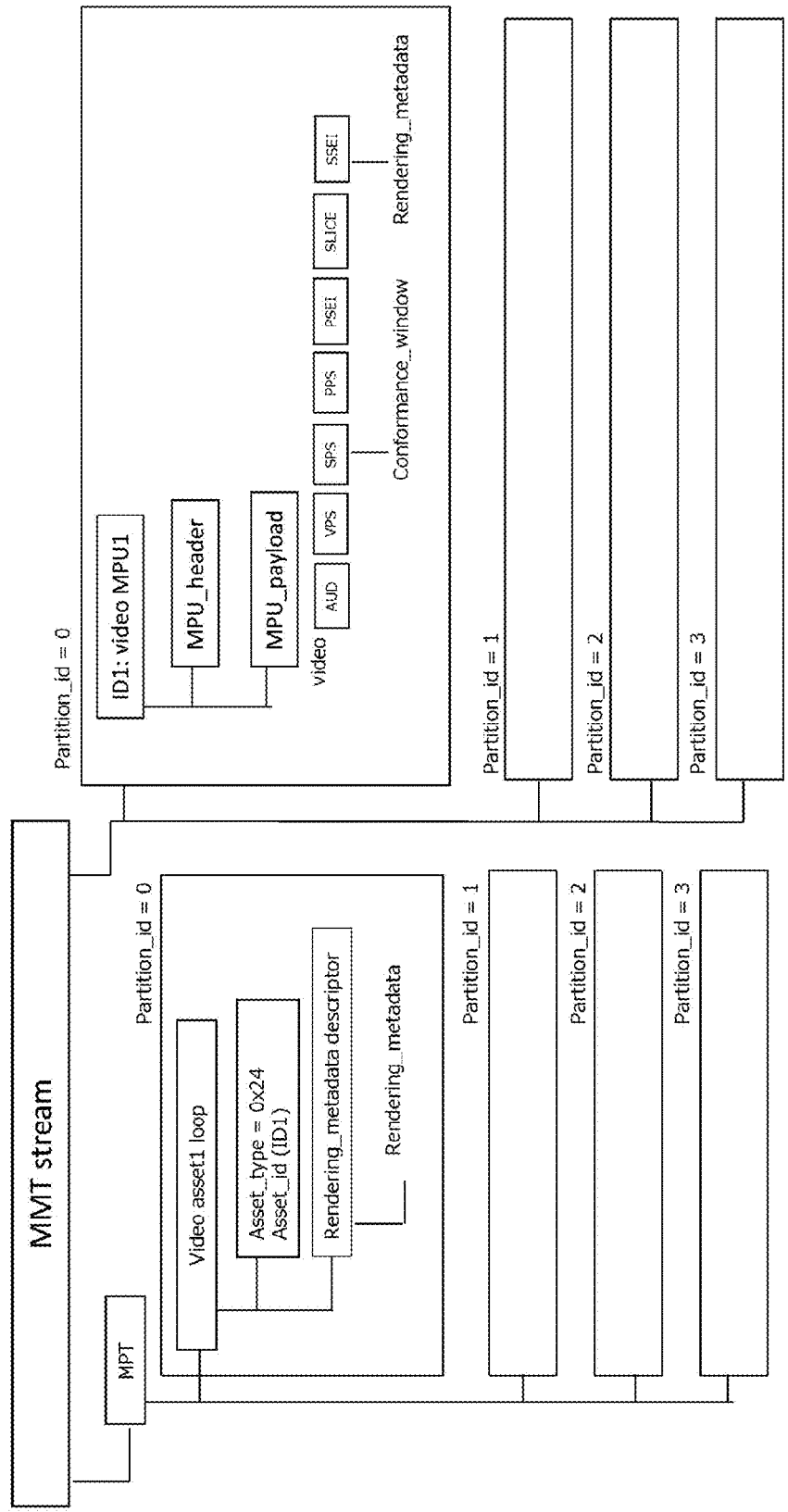
FIG. 33 is a diagram illustrating a configuration example of an MMT stream.

FIG. 33 illustrates a configuration example of an MMT stream in a case where partitioning is applied to MMT. This configuration example illustrates an example in which six views (regions) of cross-cubic, namely, "top", "front", "bottom", "right", "back", and "left" are divided into four partitions (see FIG. 26) with partition IDs (partition id) 0 to 3, and transferred in four video streams for each partition.

This configuration example contains an MPU packet "video MPU" of each of the four video streams. Note that, in the illustrated example, only the part of an MPU packet "video MPU1" corresponding to partition 1 (Partition id=1) is illustrated in detail. The payload of each MPU packet "video MPU" includes an access unit (encoded image data) of each picture.

In the access unit (encoded image data) containerized by the MPU packet "video MPU1", information on the cut-out position "Conformance_window" is inserted in "SPS". Furthermore, the SEI message having the rendering metadata (see FIGS. 27 and 28) is inserted in "SSEI".

In addition, the MPT contains a video asset loop (video asset1 loop) corresponding to the MPU packet "video MPU" of each of the four video streams. Information such as a stream type and a packet identifier (PID) is arranged in the video asset loop (video asset1 loop) in correspondence to the video stream (video MPU), and also a descriptor that describes information associated with this video streams is arranged therein. Furthermore, the rendering metadata descriptor including the rendering metadata (see FIGS. 27 and 28) is inserted as one of the descriptors.

"Case of HDMI Transfer"

In addition, the above embodiments have indicated an example of the transmission/reception system 10 constituted by the service transmission system 100 and the service receiver 200; however, the configuration of the transmission/reception system to which the present technology can be applied is not limited to this example. A case where the part of the television receiver 200 is performed by a set-top box and a display connected through a digital interface such as high-definition multimedia interface (HDMI) is also conceivable, for example. Note that "HDMI" is a registered trademark.

Figure 34:
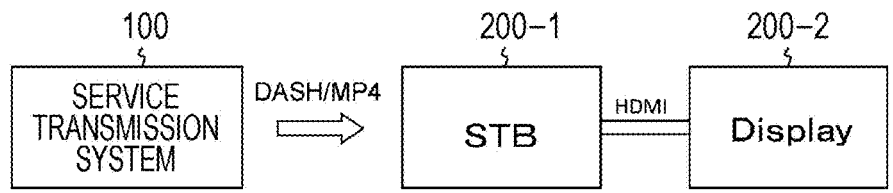
FIG. 34 is a diagram illustrating another configuration example of the transmission/reception system.

FIG. 34 illustrates a configuration example of a transmission/reception system 10A. This transmission/reception system 10A has a configuration including the service transmission system 100, a set-top box (STB) 200-1, and a display 200-2. The set-top box (STB) 200-1 and the display 200-2 are connected by HDMI.

Since the service transmission system 100 is the same as the transmission device 100 in the transmission/reception system 10 illustrated in FIG. 3, the description thereof will be omitted. The set-top box 200-1 receives MP4 (ISOBMFF) sent from the service transmission system 100 through a communication network transfer path or an RF transfer path.

Furthermore, the set-top box 200-1 retrieves a video stream from the MP4 and decodes the retrieved video stream to obtain image data of a projection picture. When the display 200-2 is a VR-compatible display, the set-top box 200-1 sends this image data of the projection picture and rendering metadata (meta information for rendering) extracted from a layer of the container and/or the video stream to the display 200-2 via an HDMI transfer path.

On the other hand, when the display 200-2 is a VR non-compatible display, the set-top box 200-1 performs cut-out processing on the projection picture on the basis of the cut-out position information inserted in the layer of the video stream to obtain image data of the cut-out image.

Then, the set-top box 200-1 sends this image data of the cut-out image to the display 200-2 via the HDMI transfer path.

When the display 200-2 is a VR-compatible display, the display 200-2 accepts the image data and the rendering metadata of the projection picture from the set-top box 200-1 via the HDMI transfer path. Then, the display 200-2 renders the projection picture on the basis of the meta information for rendering to obtain and display the rendering image. In this case, a rendering image corresponding to the default view (default region) or another view (region) is obtained and displayed according to a user operation.

When the display 200-2 is a VR non-compatible display, the display 200-2 accepts the image data of the cut-out image from the set-top box 200-1 via the HDMI transfer path, and displays the cut-out image.

The set-top box 200-1 inserts the rendering metadata (meta information for rendering) into a blanking period of the image data of the projection picture, and transmits the rendering metadata to the display 200-2 that is a VR-compatible display. Here, a newly defined HDMI info frame (HDMI Info Frame) for rendering metadata is used.

FIGS. 35 and 36 illustrate a structure example (Syntax) of the HDMI info frame for rendering metadata. The first three bytes of this HDMI info frame is a header part, and information on the info frame type, version number, and byte length of the data byte is arranged.

A 5-bit piece of information of "Projection format type" is arranged from the seventh bit to the third bit of data byte 1 (Data Byte 1). This 5-bit piece of information indicates the format type of the projection picture. Furthermore, a 1-bit piece of information "BW compatible" is arranged in the zeroth bit of data byte 1 (Data Byte 1). This 1-bit piece of information indicates whether or not backward compatibility is set, that is, whether or not the center O (p, q) of the cut-out position indicated by the cut-out position information is set to coincide with the reference point RP (x, y) of the projection picture.

An 8-bit piece of information of "Number of regions" is arranged in data byte 2 (Data Byte 2). This 8-bit piece of information indicates the number of regions in the projection picture.

A 16-bit piece of information of "Start offset sphere latitude" is arranged in each of data byte 3 (Data Byte 3) and data byte 4 (Data Byte 4). These 16-bit pieces of information indicate the latitude (vertical direction) of the start offset for cutting off from the sphere surface.

A 16-bit piece of information of "Start offset sphere longitude" is arranged in each of data byte 5 (Data Byte 5) and data byte 6 (Data Byte 6). These 16-bit pieces of information indicate the longitude (horizontal direction) of the start offset for cutting off from the sphere surface.

A 16-bit piece of information of "End offset sphere latitude" is arranged in each of data byte 7 (Data Byte 7) and data byte 8 (Data Byte 8). These 16-bit pieces of information indicate the latitude (vertical direction) of the end offset for cutting off from the sphere surface.

A 16-bit piece of information of "End offset sphere longitude" is arranged in each of data byte 9 (Data Byte 9) and data byte 10 (Data Byte 10). These 16-bit pieces of information indicate the longitude (horizontal direction) of the end offset for cutting off from the sphere surface.

A 16-bit piece of information of "Projection pic size horizontal" is arranged in each of data byte 11 (Data Byte 11) and data byte 12 (Data Byte 12). These 16-bit pieces of information indicate the horizontal pixel count from the top-left in the size of the projection picture.

A 16-bit piece of information of "Projection pic size vertical" is arranged in each of data byte 13 (Data Byte 13) and data byte 14 (Data Byte 14). These 16-bit pieces of information indicate the vertical pixel count from the top-left in the size of the projection picture.

A 16-bit piece of information of "Scaling ratio horizontal" is arranged in each of data byte 15 (Data Byte 15) and data byte 16 (Data Byte 16). These 16-bit pieces of information indicate the horizontal scaling ratio from the original size of the projection picture.

A 16-bit piece of information of "Scaling ratio vertical" is arranged in each of data byte 17 (Data Byte 17) and data byte 18 (Data Byte 18). These 16-bit pieces of information indicate the vertical scaling ratio from the original size of the projection picture.

A 16-bit piece of information of "Reference point horizontal" is arranged in each of data byte 19 (Data Byte 19) and data byte 20 (Data Byte 20). These 16-bit pieces of information indicate the horizontal pixel position "x" of the reference point RP (x, y) of the projection picture.

A 16-bit piece of information of "Reference point vertical" is arranged in each of data byte 21 (Data Byte 21) and data byte 22 (Data Byte 22). These 16-bit pieces of information indicate the vertical pixel position "y" of the reference point RP (x, y) of the projection picture.

Data byte 23 (Data Byte 23) and subsequent data bytes are contained in a case where the number of regions in the projection picture indicated by the above-described 8-bit piece of information of "Number of regions" is two or more. An 8-bit piece of information of "Region id[0]" is arranged in data byte 23 (Data Byte 23). This 8-bit piece of information indicates the identification number of the first region.

A 16-bit piece of information of "Start offset horizontal region[0]" is arranged in each of data byte 24 (Data Byte 24) and data byte 25 (Data Byte 25). These 16-bit pieces of information indicate the horizontal start pixel offset of the first region.

A 16-bit piece of information of "Start offset vertical region[0]" is arranged in each of data byte 26 (Data Byte 26) and data byte 27 (Data Byte 27). These 16-bit pieces of information indicate the vertical start pixel offset of the first region.

A 16-bit piece of information of "Width region[0]" is arranged in each of data byte 28 (Data Byte 28) and data byte 29 (Data Byte 29). These 16-bit pieces of information indicate the horizontal width of the first region by the number of pixels.

A 16-bit piece of information of "Height region[0]" is arranged in each of data byte 30 (Data Byte 30) and data byte 31 (Data Byte 31). These 16-bit pieces of information indicate the vertical width of the first region by the number of pixels.

The seventh bit of data byte 32 (Data Byte 32) includes a 1-bit piece of information of "Default region flag[0]". This 1-bit piece of information indicates whether or not the first region is the default region.

In data byte 33 (Data Byte 33) and subsequent data bytes, a space similar to the space from data byte 23 (Data Byte 23) to data byte 32 (Data Byte 32) described above is repeatedly inserted, depending on the value of "Number of regions", that is, the number of regions.

Note that, in the structure example of the HDMI info frame for rendering metadata illustrated in FIGS. 35 and 36, the rendering metadata corresponding to FIG. 9 is inserted; however, a case where the rendering metadata corresponding to FIG. 11 that does not have information on the reference point RP (x, y) of the projection picture is inserted can be similarly considered.

Also in the transmission/reception system 10A illustrated in FIG. 34, the rendering image corresponding to the default view displayed on the display 200-2 compatible with VR and the cut-out image displayed on the display 200-2 not compatible with VR form a common image; accordingly, it becomes possible to obtain a common image between the VR-compatible display and the VR non-compatible display.

Note that the present technology can be also configured as described below.

(1) A transmission device including:
a processing unit that cuts off a part or whole of a spherical capture image and performs in-plane packing on the cut-off spherical capture image to obtain a projection picture having a rectangular shape;
an encoding unit that encodes image data of the projection picture to obtain a video stream;
a transmission unit that transmits a container including the video stream; and
an insertion unit that inserts meta information for rendering the projection picture into a layer of the container and/or the video stream, in which
a center of a cut-out position indicated by cut-out position information inserted in a layer of the video stream coincides with a reference point of the projection picture indicated by the meta information for rendering.

(2) The transmission device according to (1) above, in which
the projection picture is made up of a plurality of regions including a default region whose position is centered on the reference point, and
a position indicated by the cut-out position information is adjusted to coincide with the position of the default region.

(3) The transmission device according to (1) or (2) above, in which
the meta information for rendering has position information on the reference point.

(4) The transmission device according to any one of (1) to (3) above, in which
the meta information for rendering has backward compatibility information indicating that the center of the cut-out position indicated by the cut-out position information inserted in the layer of the video stream coincides with the reference point of the projection picture indicated by the meta information for rendering.

(5) The transmission device according to any one of (1) to (4) above, in which
the transmission unit further transmits a metafile having meta information regarding the video stream, and
identification information indicating a fact that the meta information for rendering is inserted in a layer of the container and/or the video stream is further inserted into the metafile.

(6) The transmission device according to any one of (1) to (4) above, in which
the container is in an International Organization for Standardization base media file format (ISOBMFF), and
the insertion unit inserts the meta information for rendering into a moov box.

(7) The transmission device according to any one of (1) to (4) above, in which
the container includes a moving picture experts group 2-transport stream (MPEG2-TS), and
the insertion unit inserts the meta information for rendering into a program map table.

(8) The transmission device according to any one of (1) to (4) above, in which
the container includes a moving picture experts group media transport (MMT) stream, and
the insertion unit inserts the meta information for rendering into an MMT package table.

(9) A transmission method including:
a processing step, by a processing unit, of cutting off a part or whole of a spherical capture image and performing in-plane packing on the cut-off spherical capture image to obtain a projection picture having a rectangular shape;
an encoding step, by an encoding unit, of encoding image data of the projection picture to obtain a video stream;
a transmission step, by a transmission unit, of transmitting a container including the video stream; and
an insertion step, by an insertion unit, of inserting meta information for rendering the projection picture into a layer of the container and/or the video stream, in which
a center of a cut-out position indicated by cut-out position information inserted in a layer of the video stream coincides with a reference point of the projection picture indicated by the meta information for rendering.

(10) A reception device including
a reception unit that receives a container including a video stream obtained by encoding image data of a projection picture having a rectangular shape, in which
the projection picture is obtained by cutting off a part or whole of a spherical capture image and performing in-plane packing on the cut-off spherical capture image,
meta information for rendering the projection picture is inserted in a layer of the container and/or the video stream, and
a center of a cut-out position indicated by cut-out position information inserted in a layer of the video stream coincides with a reference point of the projection picture indicated by the meta information for rendering,
the reception device further including a control unit that controls: processing of decoding the video stream to obtain the projection picture; processing of rendering the projection picture on the basis of the meta information for rendering to obtain a first display image; processing of cutting out the projection picture on the basis of the cut-out position information to obtain a second display image; and processing of selectively retrieving the first display image or the second display image.

(11) A reception method including
a reception step, by a reception unit, of receiving a container including a video stream obtained by encoding image data of a projection picture having a rectangular shape, in which
the projection picture is obtained by cutting off a part or whole of a spherical capture image and performing in-plane packing on the cut-off spherical capture image,
meta information for rendering the projection picture is inserted in a layer of the container and/or the video stream, and
a center of a cut-out position indicated by cut-out position information inserted in a layer of the video stream coincides with a reference point of the projection picture indicated by the meta information for rendering,
the reception method further including a control step, by a processing unit, of controlling: processing of decoding the video stream to obtain the projection picture; processing of rendering the projection picture on the basis of the meta information for rendering to obtain a first display image; processing of cutting out the projection picture on the basis of the cut-out position information to obtain a second display image; and processing of selectively retrieving the first display image or the second display image.

(12) A reception device including a reception unit that receives a container including a video stream obtained by encoding image data of a projection picture having a rectangular shape, in which the projection picture is obtained by cutting off a part or whole of a spherical capture image and performing in-plane packing on the cut-off spherical capture image, meta information for rendering the projection picture is inserted in a layer of the container and/or the video stream, and a center of a cut-out position indicated by cut-out position information inserted in a layer of the video stream coincides with a reference point of the projection picture indicated by the meta information for rendering, the reception device further including a control unit that controls: processing of decoding the video stream to obtain the projection picture; and processing of cutting out the projection picture on the basis of the cut-out position information to obtain a display image.

(13) A reception method including a reception step, by a reception unit, of receiving a container including a video stream obtained by encoding image data of a projection picture having a rectangular shape, in which the projection picture is obtained by cutting off a part or whole of a spherical capture image and performing in-plane packing on the cut-off spherical capture image, meta information for rendering the projection picture is inserted in a layer of the container and/or the video stream, and a center of a cut-out position indicated by cut-out position information inserted in a layer of the video stream coincides with a reference point of the projection picture indicated by the meta information for rendering, the reception method further including a control step, by a control unit, of controlling: processing of decoding the video stream to obtain the projection picture; and processing of cutting out the projection picture on the basis of the cut-out position information to obtain a display image.

Figure 17:
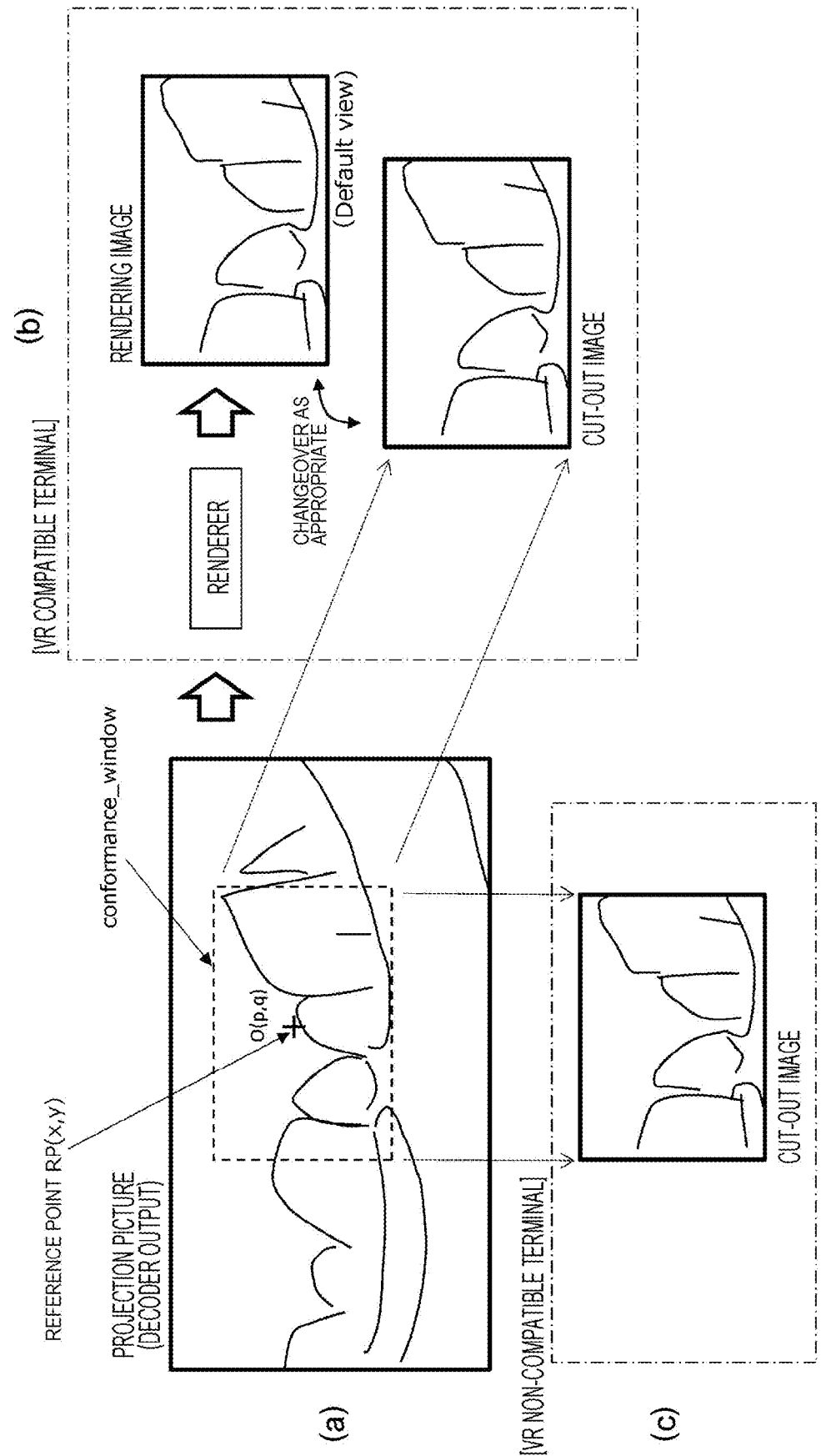
FIG. 17 is a diagram for explaining processing of a VR-compatible terminal and a VR non-compatible terminal with respect to the projection picture.

The main feature of the present technology is that the center of the cut-out position indicated by the cut-out position information inserted in a layer of the video stream is set to coincide with the reference point of the projection picture, whereby the rendering image corresponding to the default view displayed on the VR-compatible terminal and the cut-out image displayed on the VR non-compatible terminal are formed as a common image (see FIGS. 7, 8, and 17).

REFERENCE SIGNS LIST

10, 10A Transmission/reception system
100 Service transmission system
101 Control unit
102 Camera
103 In-plane packing unit
104 Video encoder
105 Container encoder
106 Transmission unit
200, 200A, 200B Service receiver
201, 231 Control unit
202, 232 Reception unit
203, 233 Container decoder
204, 234 Video decoder
205 Renderer
206, 235 Cut-out unit
207 Changeover switch
208, 236 Scaling unit
209, 237 Display unit

The invention claimed is:

1. A transmission device comprising:
   circuitry configured to
      cut out a part or whole of a spherical capture image and perform in-plane packing on the cut-out spherical capture image to obtain a projection picture having a rectangular shape;
      encode image data of the projection picture to obtain a video stream;
      transmit a container including the video stream; and
      insert meta information for rendering the projection picture into at least one of a layer of the container or a layer of the video stream and cut-out position information in the layer of the video stream, wherein
   a center of a cut-out position indicated by the cut-out position information coincides with a reference point of the projection picture indicated by the meta information for rendering, and
   the projection picture is made up of a plurality of regions including a default region with a position that is centered on the reference point.

2. The transmission device according to claim 1, wherein a position indicated by the cut-out position information is adjusted to coincide with the position of the default region.

3. The transmission device according to claim 1, wherein the meta information for rendering has position information on the reference point.

4. The transmission device according to claim 1, wherein the meta information for rendering has backward compatibility information indicating that the center of the cut-out position indicated by the cut-out position information inserted in the layer of the video stream coincides with the reference point of the projection picture indicated by the meta information for rendering.

5. The transmission device according to claim 1, wherein the circuitry is configured to transmit a metafile having meta information regarding the video stream, and identification information indicating a fact that the meta information for rendering is inserted in the at least one of the layer of the container or the layer of the video stream is further inserted into the metafile.

6. The transmission device according to claim 1, wherein the container is in an International Organization for Standardization base media file format (ISOBMFF), and the circuitry is configured to insert the meta information for rendering into a moov box.

7. The transmission device according to claim 1, wherein the container includes a moving picture experts group 2—transport stream (MPEG2-TS), and the circuitry is configured to insert the meta information for rendering into a program map table.

8. The transmission device according to claim 1, wherein the container includes a moving picture experts group media transport (MMT) stream, and the circuitry is configured to insert the meta information for rendering into an MMT package table.

9. A reception device comprising
   a receiver configured to receive a container including a video stream obtained by encoding image data of a projection picture having a rectangular shape, wherein the projection picture is obtained by cutting off a part or whole of a spherical capture image and performing in-plane packing on the cut-off spherical capture image, meta information for rendering the projection picture is inserted in at least one of a layer of the container or a layer of the video stream, and cut-out position information is inserted in the layer of the video stream, a center of a cut-out position indicated by the cut-out position information coinciding with a reference point of the projection picture indicated by the meta information for rendering, the reception device further comprising circuitry configured to control processing of decoding the video stream to obtain the projection picture; processing of rendering the projection picture on a basis of the meta information for rendering to obtain a first display image;

control processing of cutting out the projection picture on a basis of the cut-out position information to obtain a second display image; and control processing of selectively retrieving the first display image or the second display image, wherein the projection picture is made up of a plurality of regions including a default region with a position that is centered on the reference point.

10. A reception device comprising a receiver configured to receive a container including a video stream obtained by encoding image data of a projection picture having a rectangular shape, wherein the projection picture is obtained by cutting off a part or whole of a spherical capture image and performing in-plane packing on the cut-off spherical capture image, meta information for rendering the projection picture is inserted in at least one of a layer of the container or a layer of the video stream, and cut-out position information is inserted in the layer of the video stream, a center of a cut-out position indicated by the cut-out position information coinciding with a reference point of the projection picture indicated by the meta information for rendering, the reception device further comprising circuitry configured to control processing of decoding the video stream to obtain the projection picture; and control processing of cutting out the projection picture on a basis of the cut-out position information to obtain a display image, wherein the projection picture is made up of a plurality of regions including a default region with a position that is centered on the reference point.

11. The reception device according to claim 9, wherein a position indicated by the cut-out position information is adjusted to coincide with the position of the default region.

12. The reception device according to claim 9, wherein the meta information for rendering has position information on the reference point.

13. The reception device according to claim 9, wherein the meta information for rendering has backward compatibility information indicating that the center of the cut-out position indicated by the cut-out position information inserted in the layer of the video stream coincides with the reference point of the projection picture indicated by the meta information for rendering.

14. The reception device according to claim 9, wherein the receiver is configured to receive a metafile having meta information regarding the video stream, and identification information indicating a fact that the meta information for rendering is inserted in the at least one of the layer of the container or the layer of the video stream is further inserted into the metafile.

15. The reception device according to claim 10, wherein a position indicated by the cut-out position information is adjusted to coincide with the position of the default region.

16. The reception device according to claim 10, wherein the meta information for rendering has position information on the reference point.

17. The reception device according to claim 10, wherein the meta information for rendering has backward compatibility information indicating that the center of the cut-out position indicated by the cut-out position information inserted in the layer of the video stream coincides with the reference point of the projection picture indicated by the meta information for rendering.

18. The reception device according to claim 10, wherein the receiver is configured to receive a metafile having meta information regarding the video stream, and identification information indicating a fact that the meta information for rendering is inserted in the at least one of the layer of the container or the layer of the video stream is further inserted into the metafile.

* * * * *